(12) United States Patent
Tomita

(10) Patent No.: US 7,018,045 B2
(45) Date of Patent: Mar. 28, 2006

(54) IMAGE DISPLAY APPARATUS AND IMAGE DISPLAY METHOD

(75) Inventor: Hideo Tomita, Tokyo (JP)

(73) Assignee: Sony Corporation, (JP)

( * ) Notice: Subject to any disclaimer, the term of this patent is extended or adjusted under 35 U.S.C. 154(b) by 64 days.

(21) Appl. No.: 10/689,707

(22) Filed: Oct. 22, 2003

(65) Prior Publication Data

US 2004/0130682 A1  Jul. 8, 2004

(30) Foreign Application Priority Data

Oct. 23, 2002  (JP) .......................... P2002-308493

(51) Int. Cl.
*G03B 21/00* (2006.01)
*H04N 7/167* (2006.01)
*H04N 5/74* (2006.01)
*G02F 1/00* (2006.01)
*G02B 26/00* (2006.01)

(52) U.S. Cl. ............................. 353/31; 353/31; 353/34; 353/84; 353/122; 380/213; 348/750; 348/757; 359/237

(58) Field of Classification Search .................. 353/31, 353/20, 30, 33, 34, 81, 84, 98, 99, 122, 32, 353/35, 36, 37, 70, 82, 88, 89; 352/42, 66, 352/38, 40, 41, 55, 90, 133, 138, 244; 345/590; 380/200, 201, 203, 204, 213, 217; 359/237, 359/622; 348/744, 750, 755, 757–759, 764, 348/766, 770, 771
See application file for complete search history.

(56) References Cited

U.S. PATENT DOCUMENTS 5,959,717 A   9/1999  Chaum (Continued)

FOREIGN PATENT DOCUMENTS

EP   1 237 369   9/2002

(Continued)

OTHER PUBLICATIONS

European Search Report, Dec. 14, 2004.

*Primary Examiner*—W. B. Perkey
*Assistant Examiner*—Rochelle Blackman
(74) *Attorney, Agent, or Firm*—Rader, Fishman & Grauer, PLLC; Ronald P. Kananen

(57) ABSTRACT

An image display apparatus and method is disclosed that can prevent shot-sneaking of an image displayed by a projector apparatus. The projector apparatus embeds a display image portion in which the same color is represented with another color space of R, Cy, and B by color space conversion as a shot-sneaking preventing image portion into an original image as a display image for which a color space of R, G, and B is used to reproduce a color. The shot-sneaking preventing image portion appears to the visual sense of the human being as the same color as that of the oringinal image. However, the color component values of R and B are different in terms of the color component values of R and B between the color space of R, G, and B and the color space of R, Cy, and B. Therefore, for example, if a camera that picks up an image in accordance with the R, G, B method is used to pick up an image of the display image, then the picked-up display image is reproduced in a color different from the original color.

6 Claims, 13 Drawing Sheets

U.S. PATENT DOCUMENTS

| | | | |
|---|---|---|---|
| 6,018,374 A | 1/2000 | Wrobleski | |
| 6,736,514 B1 * | 5/2004 | Horvath et al. | 353/31 |
| 2002/0021824 A1 | 2/2002 | Reed et al. | |
| 2003/0118183 A1 * | 6/2003 | Struyk | 380/213 |

FOREIGN PATENT DOCUMENTS

| | | |
|---|---|---|
| WO | WO 01/56279 | 8/2001 |
| WO | WO 01/95544 | 12/2001 |

* cited by examiner

FIG. 3A

|  | x | y |
|---|---|---|
| R | 0.68 | 0.3 |
| G | 0.22 | 0.75 |
| B | 0.11 | 0.07 |
| Cy | 0.01 | 0.54 |
| Target | 0.31 | 0.32 |

FIG. 3B

| R | 0.299476 |
|---|---|
| G | 0.266354 |
| B | 0.434171 |

FIG. 3C

| R | 0.409075 |
|---|---|
| Cy | 0.331729 |
| B | 0.259196 |

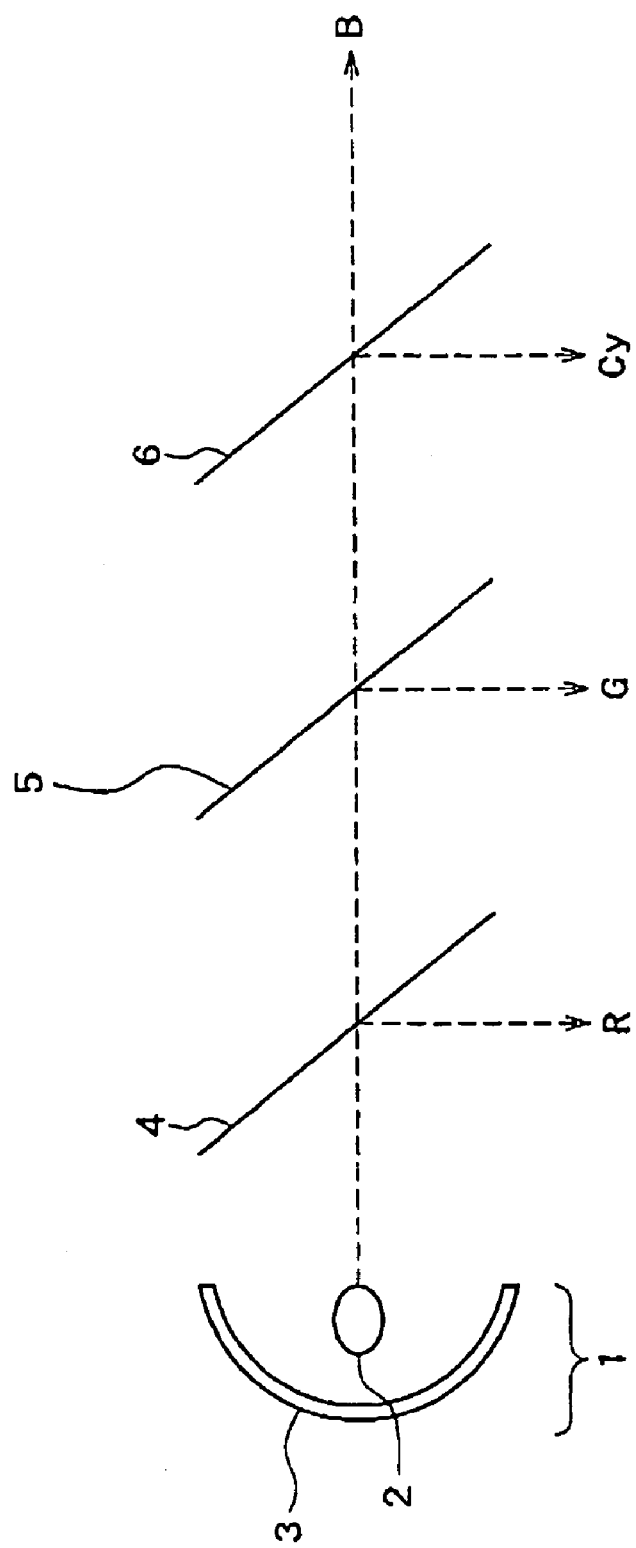

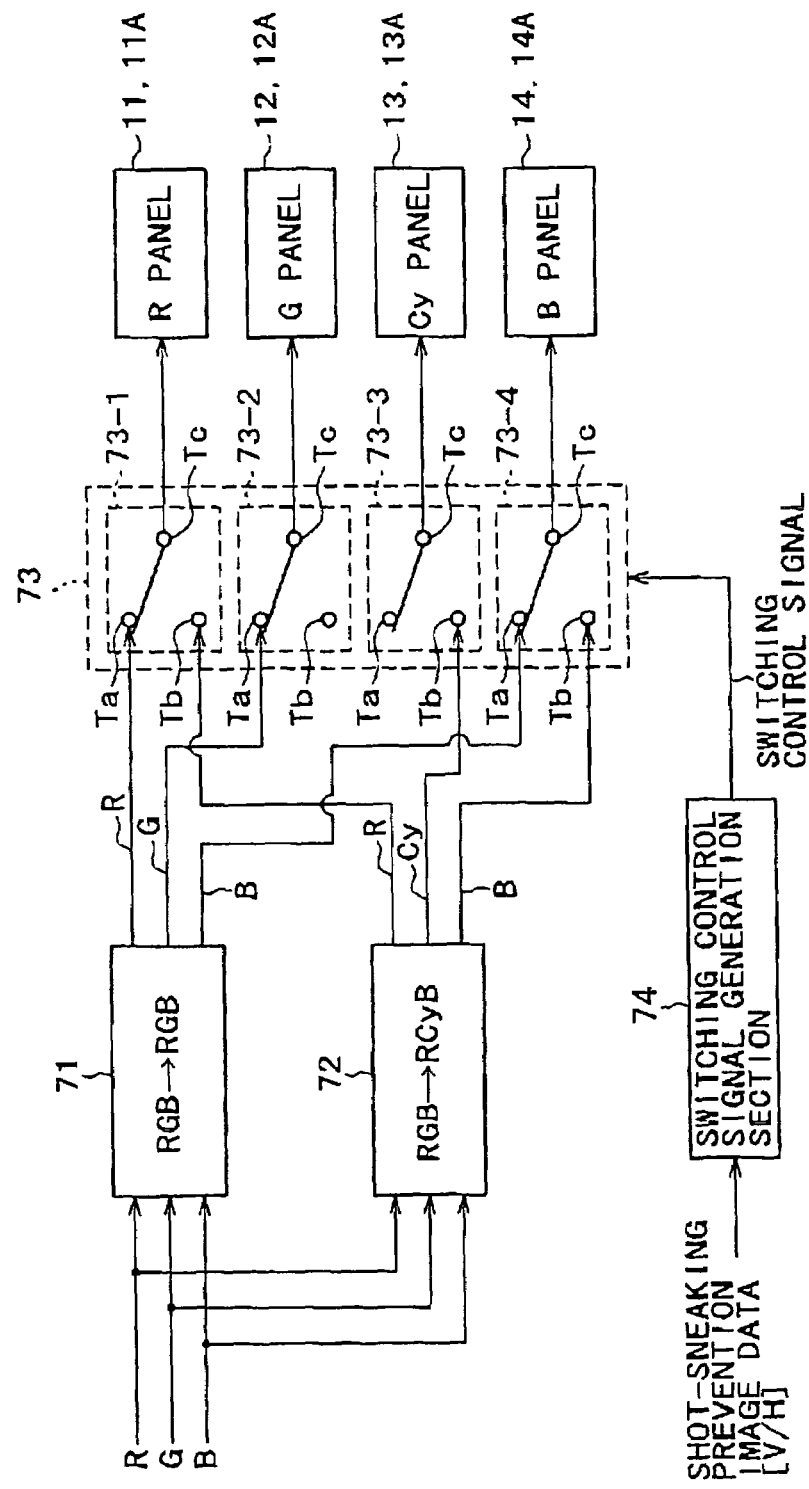

IMAGE DISPLAY APPARATUS AND IMAGE DISPLAY METHOD

BACKGROUND OF THE INVENTION

This invention relates to an image display apparatus such as, for example, a projector apparatus and an image display method suitable for use with the image display apparatus.

The use of an image display apparatus, a projector apparatus has spread widely.

One such projector apparatus, a projector apparatus of the front projection type, is known wherein image light (projection image light) is projected to a screen of the reflection type from the front side of the latter. In another example, a projector apparatus of the rear projection type is known wherein image light is projected to a screen of the transmission type from the rear side of the latter.

In the projector apparatus of the types described above, for example, light produced by a white light source is collimated into a flux of light by a reflector or the like, and the light flux is separated into three light fluxes of the three primary colors of red, green, and blue (R, G, and B) by a color separation mirror.

The light fluxes of the three colors are introduced into two-dimensional image display devices such as, for example, LCD (Liquid Crystal Display) units formed to display image signals corresponding to the colors of red, green, and blue (R, G, and B). The image lights obtained on the two-dimensional image display devices corresponding to red, green, and blue are color synthesized into white light by a color synthesis optical system and projected in an enlarged scale onto a screen of the reflection type or the transmission type through a projection lens.

As an application of one such projector apparatus as described above, a projector apparatus is used as a motion picture projector. In other words, a projector apparatus is used as an image display apparatus for projecting an image of a motion picture onto a large screen in a theater.

Incidentally, shot-sneaking is an illegal action that is performed, which infringes upon the copyright of a motion picture. In particular, images and sound, of an actual motion picture screened in a theater is recorded secretly by means of a portable video camera from the side of the viewing audience. Then, the contents recorded by shot-sneaking in this manner are further screened without permission or copied onto a medium such as a video tape, which is sold or rented later.

As a result of such actions, the motion picture is screened illegally or an illegal package medium of the motion picture appears on the market. Therefore, the actions create a serious problem for the copyright owner side.

SUMMARY OF THE INVENTION

It is an object of the present invention to provide an image display apparatus and an image display method that can prevent an illegal action such as shot-sneaking of a motion picture from being screened.

In order to attain the object described above, according to an aspect of the present invention, there is provided an image display apparatus including first image light generation means for generating image lights individually corresponding to a plurality of color components, which form a first color component group, and display image light generation means for synthesizing the image lights of the individual color components generated by the first image light generation means to generate a single, first display image light. The first image light generation means sets color component values of the individual color components, which form the first color component group so that the first display image light may be generated with a chromaticity point and a luminance equal to those of a second display image light to be generated by synthesizing image lights individually corresponding to color components of a second color component group whose color components in combination are different from those of the first color component group, the first image light generation means generating image lights individually corresponding to the color components, which form the first color component group, based on the set color component values.

According to another aspect of the present invention, there is provided an image display method including a first image light generation step of generating image lights individually corresponding to a plurality of color components, which form a first color component group, and a display image light generation step of synthesizing the image lights of the individual color components generated by the first image light generation step to generate a single first display image light. The first image light generation step sets color component values of the individual color components, which form the first color component group, so that the first display image light may be generated with a chromaticity point and a luminance equal to those of a second display image light to be generated by synthesizing image lights individually corresponding to color components of a second color component group whose color components in combination are different from those of the first color component group, the first image light generation step generating image lights individually corresponding to the color components, which form the first color component group, based on the set color component values.

In the image display apparatus and the image display method, a color image used as a display image can be displayed as an image formed by synthesizing a plurality of color component lights, which form a first color component light group. When the color image is displayed according to the first color component light group, image lights corresponding to the color component lights, which form the first color component light group, are generated so that the same color as the color of the color image represented by synthesizing the color component lights, which form the second color component light group, may be visually obtained.

Here, the combination of color component lights between first and second color component light groups are different. As a result, chromaticity points of the color component lights forming the first color component light group and chromaticity points of the color component lights forming the second color component light group are set differently from each other.

Consequently, for example, if an image of the image displayed with the first color component light group is picked up by an image pickup apparatus, which obtains image pickup light, in accordance with a method corresponding to the second color component light group, then the color of the picked up image is different from the color of the image displayed with the first color component light group based on the difference in the chromaticity points described above.

BRIEF DESCRIPTION OF THE DRAWINGS

These and other objects of the invention will be seen by reference to the description, taken in connection with the accompanying drawing, in which:

FIGS. 3A, 3B, and 3C are views illustrating color component values where a target color is reproduced with three colors of R, G, and B and three colors of R, Cy, and B;

FIG. 7 is a schematic view showing an example of a configuration of a color separation optical system of a projector apparatus to which the present invention is applied;

FIG. 13 is a block diagram showing an example of a configuration of a panel driving circuit system of the projector apparatus to which the present invention is applied.

DETAILED DESCRIPTION OF THE PREFERRED EMBODIMENT

The present invention is described below in connection with a preferred embodiment thereof in which it is applied to a projector apparatus.

A known projector apparatus has the following basic configuration.

In particular, a light flux formed by collimating light of, for example, a white light source by means of a reflector or a like element is separated into a predetermined plural number of color component lights having color components different from each other by a color separation optical system. Then, the light fluxes of the separated color component lights are introduced into two-dimensional image display devices (optical modulation devices) that are individually provided and corresponding to the color component lights. Here, for example, a Liquid Crystal Display LCD) panel is used for the two-dimensional image display devices. Each of the two-dimensional image display devices optically modulates the light flux inputted thereto based on an image signal corresponding to the corresponding color component light thereby to form an image light corresponding to the color component light. Then, the image lights corresponding to the individual color component lights are synthesized into white light by a color synthesis optical system and projected, for example, in an enlarged scale onto a screen of the reflection type or the transmission type through a projection lens.

In a present situation, projector apparatuses having the basic configuration described above widely adopt an RGB three panel configuration.

In particular, the color separation optical system separates white light into three component lights of R, G, and B (red, green, and blue), and three two-dimensional image display devices are provided corresponding to the three colors of R, G, and B. The two-dimensional image display devices are driven with image signals corresponding to the color component lights of R, G, and B. The image lights obtained from the two-dimensional image display devices corresponding to the color component lights of R, G, and B are synthesized by the color synthesis optical system and projected in an enlarged scale onto the screen through the projection lens. Consequently, an image projected on the screen is composed of color images of the three color components of R, G, and B.

Figure 1A:
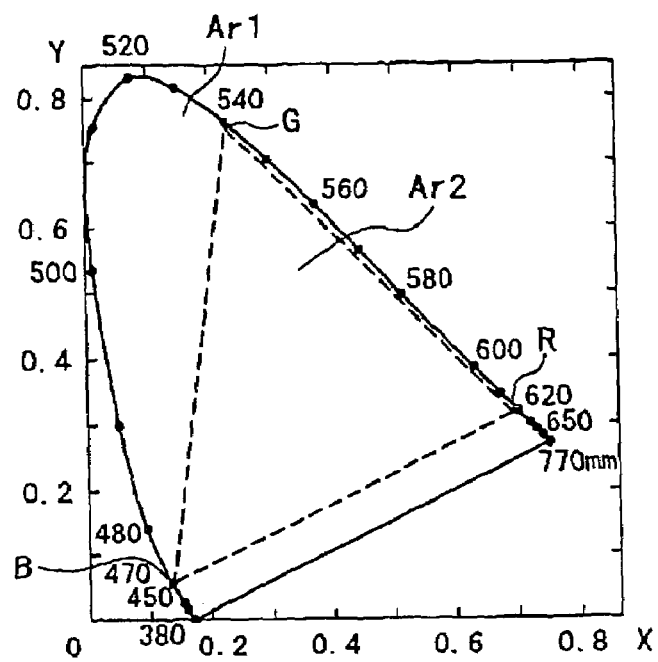
FIGS. 1A and 1B are chromaticity diagrams illustrating a color range reproducible with three colors of R, G, and B and with four colors of R, G, Cy, and B, respectively.

FIG. 1A illustrates a range of the color representable with R, G, and B on a chromaticity diagram.

As well known in the art, a horseshoe shaped region Ar1 shown on a chromaticity diagram indicates monochromatic light on a contour thereof, and all colors, that exist in the world are treated as being included in the range of the horseshoe shaped region Ar1. Further, the range of colors representable with the three primary colors R, G, and B described above is represented as a region Ar2 in FIG. 1A. In particular, if the coordinates of the colors of R, G, and B of monochromatic lights are represented on the chromaticity diagram, then the triangular region Ar2 is formed in the horseshoe region Ar1 by the coordinates. Then, the range of the region Ar2 represents the range of the color representable by the three colors R, G, and B.

In other words, the range of colors representable by the three colors of R, G, and B is limited only to the triangular region Ar2, and any color outside the range of the region Ar2 in the horseshoe region Ar1 cannot be represented.

Figure 1B:
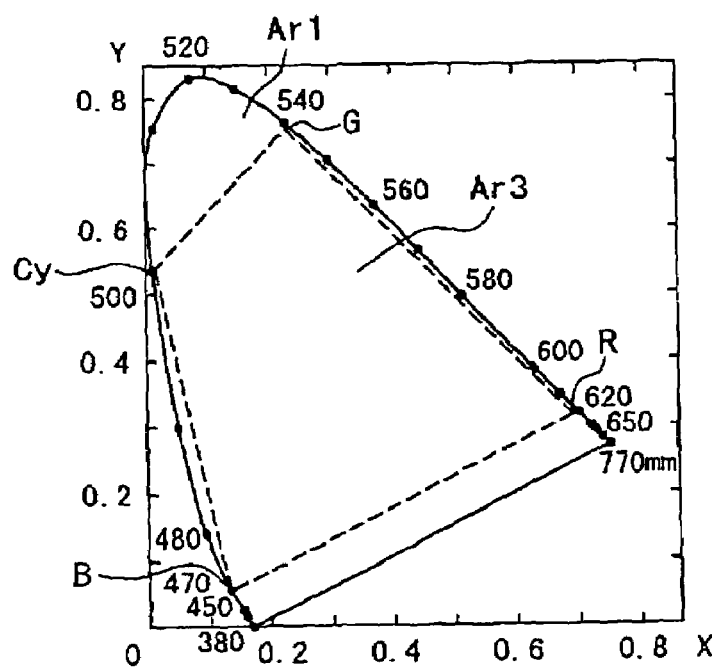

In contrast, if, for example, cyan (Cy) is added as a color component to R, G, and B, then a wider color range than the color range including the three colors R, G, and B can be represented as seen from a range Ar3 of FIG. 1B.

If this color range is applied to a projector apparatus, then a four-panel structure ready for the four colors of R, G, B, and Cy is adopted. In particular, the color separation optical system is configured such that it separates white light into four color component lights of R, G, B, and Cy, and four two-dimensional image display devices are provided corresponding to the four colors of R, G, B, and Cy. Also the two-dimensional image display devices are individually driven with image signals corresponding to the color component lights of R, G, B, and Cy. Also the color synthesis optical system is configured such that it synthesizes image lights of the two-dimensional image display devices corresponding to the color component lights of R, G, 8, and Cy and introduces the synthesized light to the projection lens. It is to be noted that a configuration of a particular color separation optical system and color synthesis optical system of such a four-panel type projector apparatus is hereinafter described.

In this instance, a color image is projected onto a screen representable with colors within the range indicated as the range Ar3 of FIG. 1B. In other words, a color image having a higher color reproducibility than a projector apparatus of the three-panel type ready for R, G, and B can be displayed. Further, since the bandwidth of white light of the light source is utilized effectively, there is an advantage that the utilization efficiency of the light source is improved and also the luminance is improved.

It is to be noted, however, that the situation is such that, with the technique at present, a projector apparatus of the three-panel type for R, G, and B provides a necessary and sufficient degree of display image quality as an image visually recognized by the human being.

Here, a manner of color reproduction where a projector apparatus of the four-panel type ready for the four colors of R, G, B, and Cy described hereinabove is examined with reference to FIG. 2.

Figure 2:
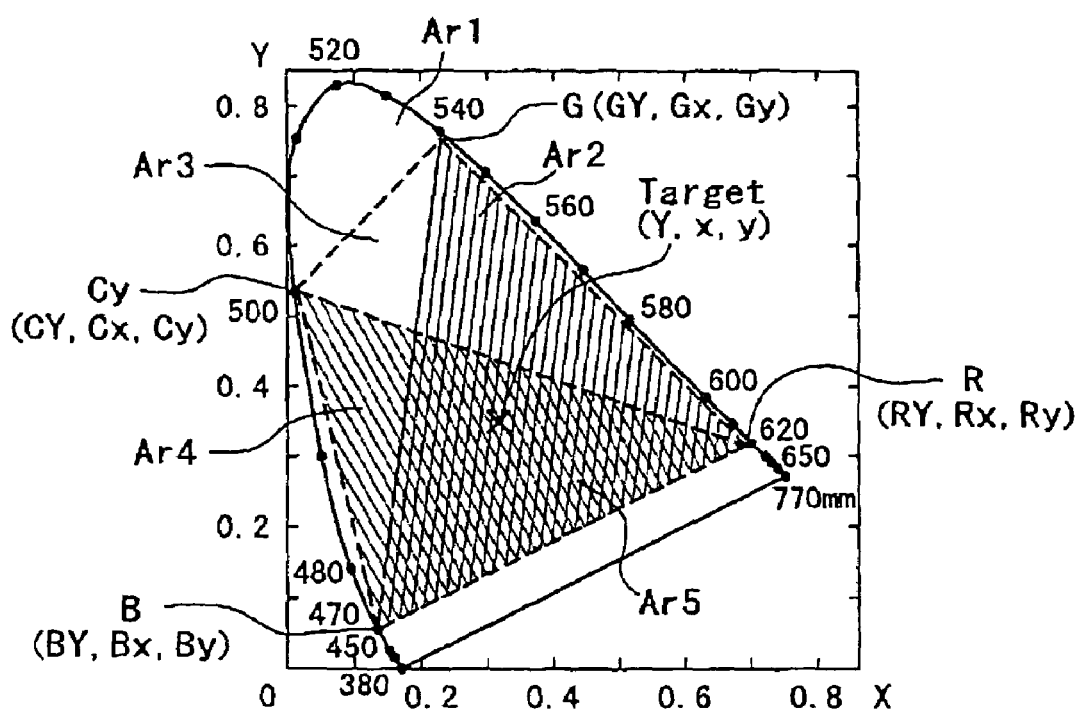
FIG. 2 is a chromaticity diagram illustrating a color reproducibility of a projector apparatus of the four panel type ready for the four colors of R, G, B, and Cy.

In the chromaticity diagram shown in FIG. 2, coordinates (chromaticity points) of R, G, B, and Cy are monochromatic lights and are shown in the horseshoe region Ar1. In particular, R(RY, Rx, Ry)
G(GY, Gx, Gy)
B(BY, Ex, By) and
Cy(CY, Cx, Cy)

are shown on the contour of the horseshoe region Ar1.

The maximum color range representable by the four-panel type projector apparatus is a quadrangular region Ar3 defined by the coordinates of R, G, B, and Cy as described hereinabove also with reference to FIG. 1B.

Further, if it is a prerequisite that a necessary and sufficient color reproducibility is obtained within the color region from the point of view of the visual sense of the human being, then the three colors of R, G, and B may be selected from among the four colors of R, G, B, and Cy. In other words, color reproduction depending upon the triangular region Ar2 formed from the coordinates of R, G, and B is possible. Further, even if R, Cy, and B are selected from among the four colors R, G, B, and Cy to perform, color reproduction based on another triangular region Ar4 defined by the coordinates of R, Cy, and B, a sufficient and necessary color reproducibility to the visual sense of the human being can be obtained.

In the horseshoe region Ar1, the triangular region Ar2 defined by the coordinates of R, G, and B and the triangular region Ar4 defined by the coordinates of R, Cy, and B have a triangular overlapping region Ar5 (region indicated by netted lines in FIG. 2) within which the reproducible color ranges overlap with each other.

Here, a target color to be reproduced for a color within the range of the overlapping region Ar5 is represented by Target (Y, x, y). Thus, if a projector apparatus of the four-panel type for R, G, B, and Cy is used to perform color reproduction with regard to the target color "Target"(Y, x, y), then the following three reproduction methods are available:

(1) The three colors R, G, and B are used for the color reproduction;
(2) The three colors R, Cy, and B are used for the color reproduction; and
(3) The four colors R, G, B, and Cy are used for the color reproduction.

In particular, when reproducing a certain color using a four-panel type projector apparatus for R, G, B, and Cy, a plurality of methods can be used for the color reproduction based on the combination of separated color component lights. In contrast, a three-panel type projector apparatus for R, G, and B can adopt only one method wherein the three colors R, G, and B are used for the color reproduction.

Taking this factor into consideration, (1) the reproduction with the three colors R, G, and B and (2) the reproduction with the three colors R, Cy, and B are compared with each other by way of particular examples.

First, it is assumed that the coordinate values (chromaticity points) of R, G, B, Cy and the target color "Target" have values given in FIG. 3A. In particular, it is assumed that the single color lights of R, G, B, and Cy respectively have coordinate values of R(Rx, Ry)=(0.68, 0.3)
G(Gx, Gy)=(0.22, 0.75)
B(Bx, By)=(0.11, 0.07)
Cy(Cx, Cy)=(0.01, 0.54)

Further, the target color "Target" has coordinate values of
Target(x, y)=(0.31, 0.32)

The chromaticity points of R, G, B and Cy and the target color "Target" illustrated in FIG. 3A are set when the target color "Target" is reproduced with the three colors R, G, and B, and as a result, the three colors R, G, and B have the values of (color component values) illustrated in FIG. 3B. In particular, they have values of

R=0.299476
G=0.266354
B=0.434171

It is to be noted that the values of R, G, and B given as above are determined by arithmetic operation based on color space conversion.

On the other hand, the chromaticity points of R, G, B, and Cy and the target color "Target" illustrated in FIG. 3A are set when the target color "Target" is reproduced with the three colors of R, Cy, and B, and as a result the three colors R, Cy, and B are represented, through arithmetic operation based on the color space conversion, as R=0.409075
Cy=0.331729
B=0.259196 as seen in FIG. 3C.

Here, the color reproduction with the color component lights of the three colors R, G, and B and the color reproduction with the color component lights of the three colors R, Cy, and B use the color components R and B commonly between them. However, if the values of R and B in FIGS. 3B and 3C are compared with each other, then it can be recognized that, although the same target color "Target" is reproduced, the values of R and B differ between the case where the three colors R, G, and B are used and the case where the three colors R, Cy, and B are used. In other words, even if R and B are common as color component lights in a case wherein the three colors R, G, and B are used for color reproduction and a case wherein the three colors R, Cy, and B are used for color reproduction, since the odors G and Cy are different from each other, the values of R and B will inevitably differ between the two cases when trying to reproduce the same chromaticity point.

It is assumed here, for example, that an image (R, G, S type image) displayed with a certain target color "Target" reproduced with the three colors of R, G, and B and another image (R, Cy, B type image) displayed with the same target color "Target" reproduced with the three colors of R, Cy, and B are displayed by a projector. If the two images are picked up by a camera, then the phenomenon discussed below is obtained.

The R, G, B type image and the R, Cy, B type image displayed in the manner described above appear to be the same color to the visual sense of the human being. However, for example, a digital camera apparatus (including a video camera) is usually configured such that it picks up an image based on the R, G, B system to form a color pickup image. Where a camera apparatus having such a configuration as just described is used to pick up an R, G, B type image and an R, Cy, B type image, the R and B values to be used for an image pickup generation process are different between the two images. As a result, the R, G, B type image and the R, Cy, B type image picked up by the camera exhibit different colors from each other. In particular, while the R, G, B type image exhibits a substantially similar color when the human being visually observes it, the R, Cy, B type image exhibits a color quite different from that when the human being visually observes it. The difference cannot be eliminated to make the colors the same as each other in what manner the value of G, which is not common between the images picked up by the camera, is modified as far as the R and B values are different between them.

Taking notice of this point, a projector apparatus to which the present invention is applied is configured so as to prevent shot-sneaking in the following manner.

In particular, the projector apparatus of the present embodiment use an R, G, B type image as a basic projection display image (original image). In addition, the projector apparatus embeds (superimposes) an image portion in the form of an R, Cy, B type image as a shot-sneaking preventing image portion into an image region of the R, G, B type image.

Figure 4A:
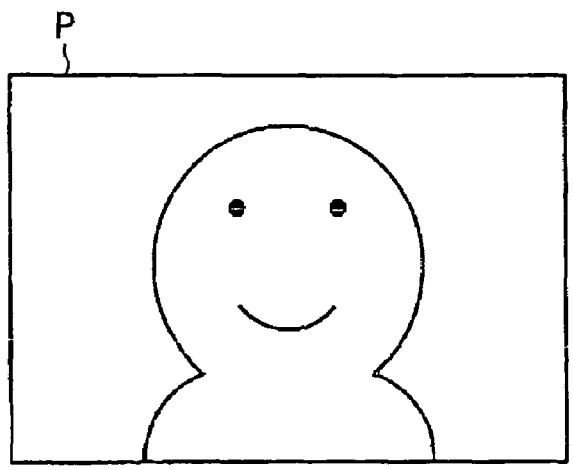
FIGS. 4A and 4B are schematic views illustrating an example of a shape pattern of a shot-sneaking preventing image portion embedded in an original image.

It is assumed here that, for example, the original image to be displayed as an R, G, B type image by the projector apparatus is a display image P shown in FIG. 4A.

In the present embodiment, an image portion in the form of an R, Cy, B type image is embedded as a shot-sneaking preventing image portion "Ppr" into the original image displayed in the manner as described above. In this instance, the shot-sneaking preventing image portion "Ppr" has an X shape.

Figure 4B:
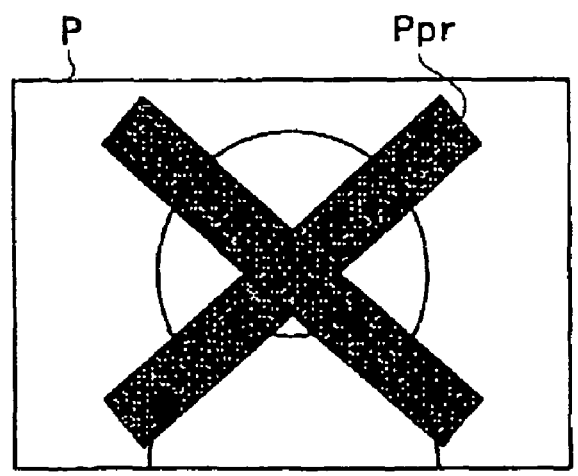

An entire display image P shown in FIG. 4B, which is displayed in the manner as described above, appears to appreciating person, looks like an image in a state similar to that when only the original image (R, G, B type image) shown in FIG. 4(a) is displayed. In other words, as far as the appreciating person appreciates the display image P shown in FIG. 4B, he can appreciate the display image P as a normal image with no problem.

However, if an image of the display image P shown in FIG. 4B is picked up, for example, using a camera, then an image only of the portion of the X mark as the shot-sneaking preventing image portion "Ppr" formed from the R, Cy, B type image in the display image P is picked up in a color different from the color that appear to the human being.

Accordingly, for example, if an image of the display image P shown in FIG. 4B is picked up and recorded by a camera, then the X mark portion of the recorded image as the shot-sneaking preventing image portion "Ppr" exhibits a color different from the color that the image should originally have. In other words, the recorded image looks like a surplus and disturbing object is displayed on the original image, and accordingly is handled as a low-quality image. Where a low quality image is recorded in this manner, the image recorded through shot-sneaking cannot be screened without permission or cannot be distributed in the form of a medium on which it is recorded. In short, an illegal action by shot-sneaking can be prevented.

Here, the shot-sneaking preventing image portion "Ppr" can be embedded into the display image P in several manners. For example, In FIG. 4B, the shot-sneaking preventing image portion "Ppr" is embedded in the display image P. However, the shot-sneaking preventing image portion "Ppr" may be formed in various shapes or designs. For example, the shot-sneaking preventing image portion "Ppr" may have a pattern or design other than the X mark or may include one or more characters.

Further, although the shot-sneaking preventing image portion "Ppr" may be formed such that a shape pattern as one image portion is displayed as a still picture on the display image P, it may otherwise be formed such that some variation is provided thereto periodically or at random as time passes.

Figure 5A:
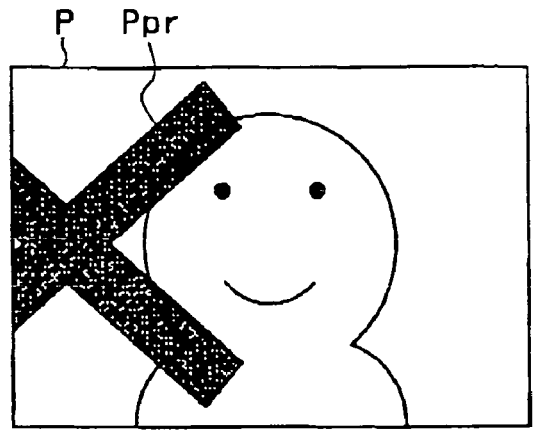
FIGS. 5A to 5C are schematic views illustrating an example of a pattern of a variation of a shot-sneaking preventing image portion embedded in an original image.
Figure 5B:
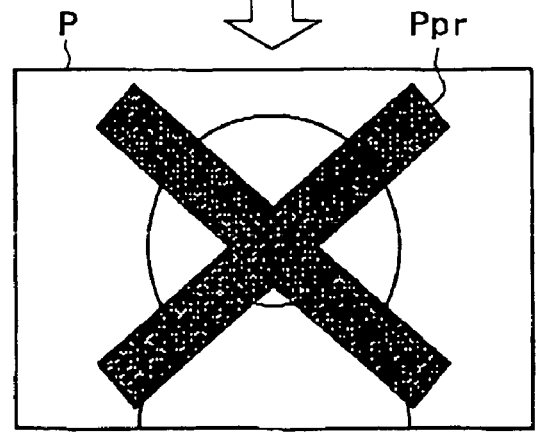
Figure 5C:
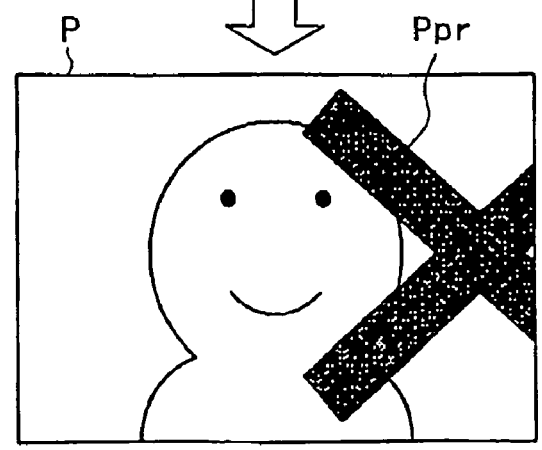

As a particular example, although the shot-sneaking preventing image portion "Ppr" of the X mark shown in FIG. 4B is displayed such that it has the same shape and remains fixed at the same position on the display image P, it may otherwise be displayed such that it periodically repeats movement thereof on the display image P as time passes as seen from a transition thereof in FIGS. 5A, 5B, and 5C. FIGS. 5A to 5C illustrate an example wherein the shot-sneaking preventing image portion "Ppr" comes out from the left of the display image P and moves rightwardly as time passes.

Figure 6A:
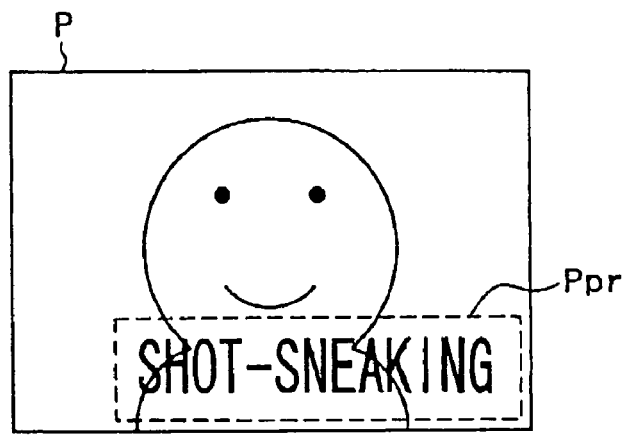
FIGS. 6A to 6C are schematic views illustrating another example of a pattern of a variation of a shot-sneaking preventing image portion embedded in an original image.
Figure 6B:
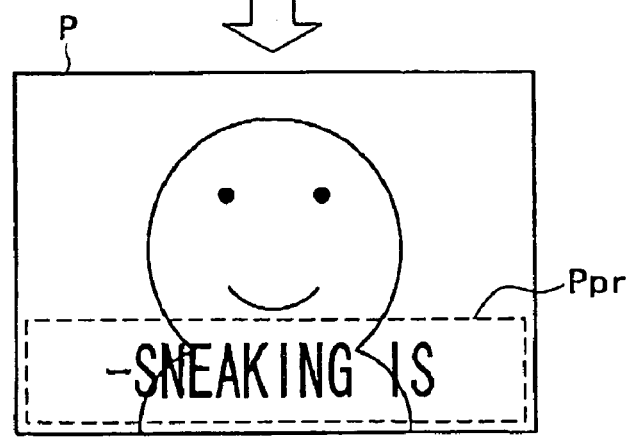
Figure 6C:
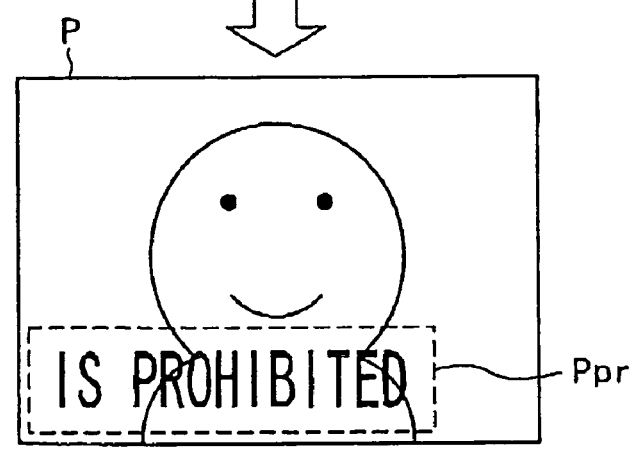

On the other hand, where the shot-sneaking preventing image portion "Ppr" is formed from characters, for example, as seen from a transition in FIGS. 6A, 6B, and 6C, E character string including a plurality of characters may be scrolled in a predetermined direction, and such scrolling may be repeated, for example, periodically to provide a variation to the embedded pattern in the shot-sneaking preventing image portion Ppr.

Further, though not shown, such a variation that the size of the shot-sneaking preventing image portion "Ppr" varies as time passes may be provided to the shot-sneaking preventing image portion Ppr.

Where a variation is provided to the embedding pattern of the shot-sneaking preventing image portion "Ppr" in this manner, the prevention of an illegal action by shot-sneaking can be further promoted. In particular, even if the shot-sneaking preventing image portion "Ppr" is embedded in the display image P, there may still remain the possibility that the color of the shot-sneaking preventing image portion "Ppr" may be corrected to the original color by performing a suitable image process for the recorded video data. Taking this possibility into consideration, it is estimated that correction is easy where the shot-sneaking preventing image portion "Ppr" is embedded fixedly (as a still picture). Thus, if some variation is provided to the embedded pattern of the shot-sneaking preventing image portion Ppr, then the correction in color of the shot-sneaking preventing image portion "Ppr" becomes more difficult and the prevention of an illegal action is intensified as much.

Accordingly, the embedded pattern of the shot-sneaking preventing image portion "Ppr" preferably is complicated as much as possible or has some randomness, for example, by causing the shot-sneaking preventing image portion "Ppr" having a comparatively complicated shape to appear at random as time passes.

Subsequently, a configuration of the projector apparatus according to the present embodiment, which can embed an R, Cy, B type image as a shot-sneaking preventing image portion "Ppr" into an R, G, B type image as an original image in such a manner as described above, is described.

Here, it is necessary for the projector apparatus according to the present embodiment to take a configuration that can form an R, G, B type image and an R, Cy, B type image and project and display them. As described hereinabove, if the projector apparatus is of the four-panel type ready for R, G, B, and Cy, then it can reproduce the same color with color component lights of the three colors R, G, and B and color component lights of the three colors of R, Cy, and B. Accordingly, the projector apparatus of the present embodiment should adopt a four-panel type configuration ready for R, G, B, and Cy.

An example of a configuration of a color separation optical system as a component of the four-panel type projector apparatus ready for R, G, B, and Cy is shown in FIG. 7.

Referring to FIG. 7, the color separation optical system shown includes a light source 1. The light source 1, in turn, includes a lamp 2 formed from, for example, a metal halide lamp and a reflector 3 in the form of a parabolic mirror. The lamp 2 is disposed at a focus position of the reflector 3. White light emitted from the lamp 2 is reflected and collimated by the reflector 3 such that it advances parallelly to an optical axis and is emitted as a light flux from an opening of the reflector 3.

In FIG. 7, the light flux of the white light emitted from the opening of the lamp 2 first arrives at an R reflecting dichroic mirror 4. The R reflecting dichroic mirror 4 reflects and separates a light flux A, which is a red color component light. The R reflecting dichroic mirror 4 passes the light flux of the remaining band therethrough.

The light flux passing through the R reflecting dichroic mirror 4 arrives at a G reflecting dichroic mirror 5. The G reflecting dichroic mirror 5 reflects and separates a light flux G, which is a green color component light, and passes the light flux of the remaining band therethrough. Then, the light flux passing through the G reflecting dichroic mirror 5 arrives at a Cy reflecting dichroic mirror 6, and the Cy reflecting dichroic mirror 6 reflects and separates a light flux Cy of a cyan, color component light. The Cy reflecting dichroic mirror 6 passes the light flux of the remaining band therethrough. The light flux passing through the Cy reflecting dichroic mirror 6 is a light flux B, which is a blue color component light.

It is to be noted that the configuration of the color separation optical system described above with reference to FIG. 7 is a configuration of a basic concept. Accordingly, the order in arrangement of the dichroic mirrors for color separation on the optical axis of a light flux emitted from the light source 1 and so forth may be altered suitably, for example, in accordance with the positional relationship with a color synthesis optical system in the following stage.

Further, though not shown in FIG. 7, the light paths of the light fluxes R, G, Cy, and B of the color components obtained by separating the white light from the light source 1 by the color separation optical system in the manner as described above are changed, if necessary, by mirrors or the like so that they may be introduced in required directions into optical modulation devices (liquid crystal panels) corresponding to the individual colors or to polarizing beam splitters for introducing the light to optical modulation devices of the reflection type.

In the actual color separation optical system or on the optical paths from the color separation optical system to the optical modulation devices, (liquid crystal panels) or to the color synthesis optical system, filters for intercepting unnecessary rays of light in an infrared wavelength region and an ultraviolet wavelength region, and multi-lens arrays, relay lenses, condenser lenses, and so forth for introducing the light fluxes efficiently to the optical modulation devices are disposed as needed.

The light fluxes R, G, Cy, and B of the color components separated by the color separation optical system as described above are introduced into the optical modulation devices respectively corresponding to the color components and are optically modulated by the optical modulation devices. The optical modulation devices in the present embodiment are liquid crystal panels of the transmission type or the reflection type as hereinafter described. The liquid crystal panels are driven with image signals corresponding to the color components R, G, Cy, and B to perform optical modulation. Since the optical modulation is performed by the liquid crystal panels, light fluxes of image light corresponding to the color components are obtained. Then, the optically modulated light fluxes of the colors are synthesized by the color synthesis optical system again and introduced into the projection lens.

Subsequently, several examples of a configuration of the color synthesis optical system in the present embodiment are described in connection with a positional relationship between the liquid crystal panels corresponding to the individual colors and the projection lens. Here, five examples including first to fifth examples of a configuration of the color synthesis optical system are described.

Figure 8:
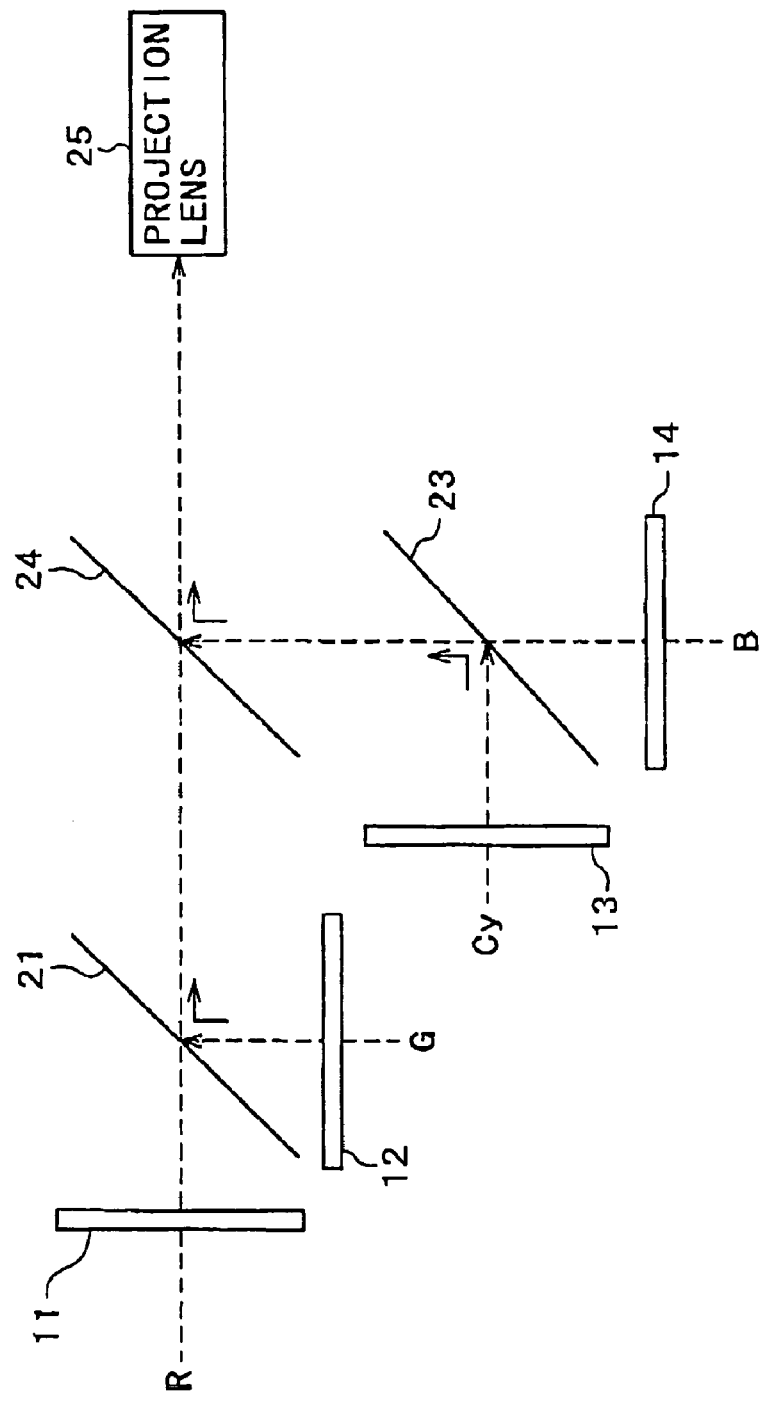
FIGS. 8 to 12 are schematic views showing different examples of a configuration of a color synthesis optical system of the projector apparatus to which the present invention is applied.

FIG. 8 shows an example of a configuration of the color synthesis optical system as a first example. The color synthesis optical system of the first example has a configuration suitable for a case wherein a liquid crystal panel of the transmission type is adopted for the optical modulation devices. In FIG. 8, the transmission type liquid crystal panels for the colors of the light fluxes R, G, Cy, and B are represented as an R panel 11, a G panel 12, a Cy panel 13, and a B panel 14, respectively.

In this instance, the R panel 11, a G reflecting dichroic mirror 21, and a Cy, B reflecting dichroic mirror 24 are disposed successively on an optical axis of a projection lens 25. A light flux R (image light of the color component R) is optically modulated when it passes the R panel 11. The light flux R thus modulated successively passes through the G reflecting dichroic mirror 21 and the B reflecting dichroic mirror 24 and is introduced into the projection lens 25.

Meanwhile, another light flux G (image light of the color component G) introduced into the G panel 12 in a different direction by 90 degrees from the optical axis of the projection lens 25 and optically modulated by the G panel 12 is reflected by the G reflecting dichroic mirror 21 so that the advancing direction thereof is changed by 90 degrees. Then, the light flux G passes through the Cy, B reflecting dichroic mirror 24 and is introduced into the projection lens 25.

A light flux Cy (image light of the color component Cy) passing through and optically modulated by the Cy panel 13 positioned at a position shown in FIG. 8 is reflected by a Cy reflecting dichroic mirror 23 such that the advancing direction thereof is changed by 90 degrees and arrives at the Cy, B reflecting dichroic mirror 24. Then, the light flux Cy is reflected by the Cy, B reflecting dichroic mirror 24 such that the advancing direction thereof is changed by 90 degrees and is introduced into the projection lens 25.

Further, a light flux B passes through and is optically modulated by the B panel 14 disposed at a Position shown in FIG. 8. Then the optically modulated light flux B (image light of the color component B) passes through the Cy reflecting dichroic mirror 23 and is reflected by the Cy, B reflecting dichroic mirror 24 so that it is introduced into the projection lens 25.

Consequently, the light fluxes R, G, Cy, and B after being optically modulated are synthesized into one light flux and can be introduced in this state as display image light into the projection lens 25. The projection lens 25 converts the incoming light flux (display image light) into projection light and projects the projection light in an enlarged scale to the screen. As a result, the enlarged display image Light is displayed as an image on the screen.

Figure 9:
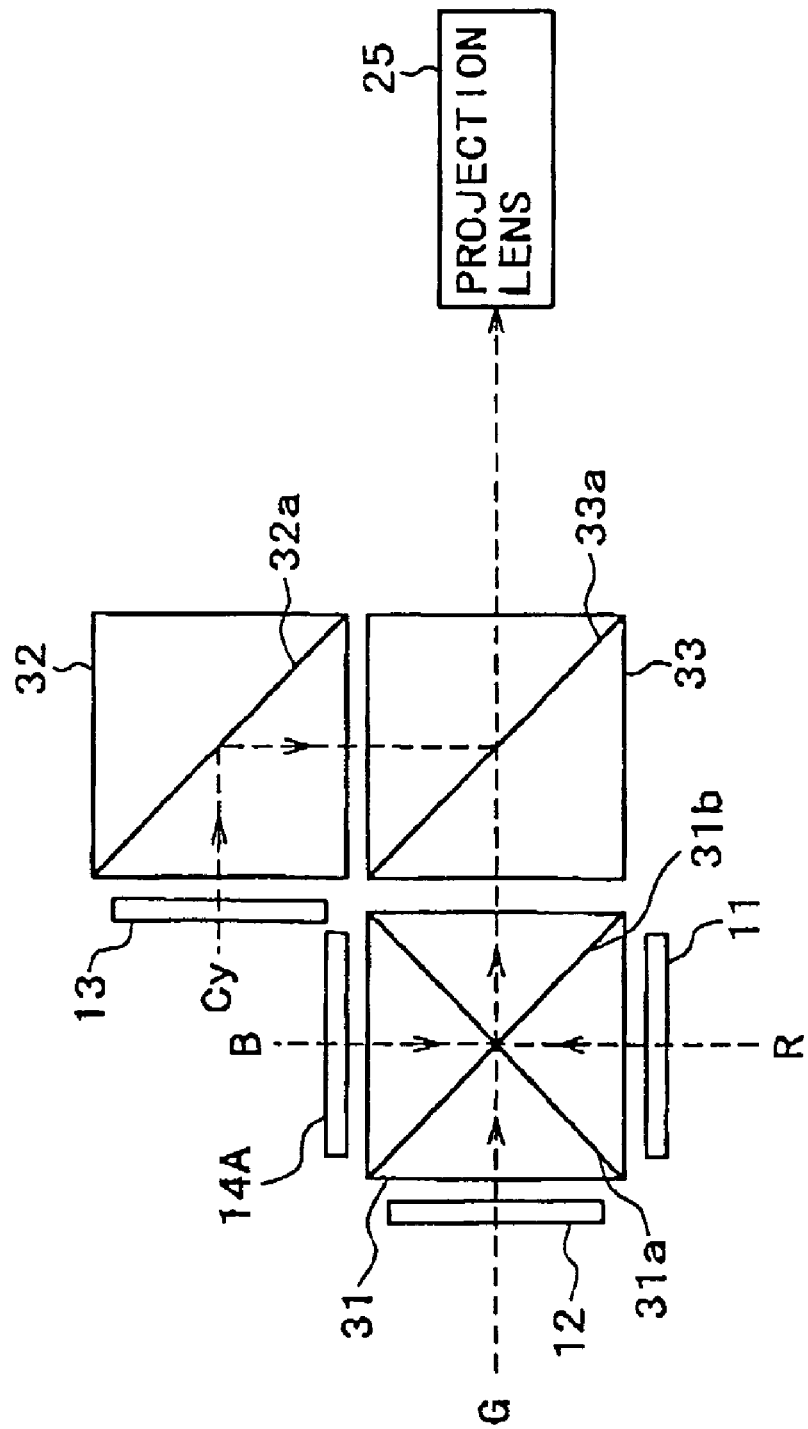

FIG. 9 shows an example of a configuration of the color synthesis optical system as a second example. Also, the configuration shown in FIG. 9 adopts a transmission type liquid crystal panel for the optical modulation devices.

The color synthesis optical system shown in FIG. 9 includes an R panel 11, a G panel 12, a Cy panel 13, and a B panel 14, which are liquid crystal panels corresponding to the colors R, G, Cy, and B respectively, a cross dichroic prism 31, a reflecting prism 32, and another cross dichroic prism 33.

A liquid crystal panel is disposed on each of three faces of the cross dichroic prism 31. In particular, the R panel 11, G panel 12, and B panel 14 are arranged on the three faces of the cross dichroic prism 31 as seen in FIG. 9. The cross dichroic prism 33 is disposed on the remaining one face of the cross dichroic prism 31. The reflecting prism 32 is disposed in a positional relationship of 90 degrees with respect to the cross dichroic prism 31 with the cross dichroic prism 33 interposed therebetween. The Cy panel 13 is disposed on one face of the reflecting prism 32.

A light flux R passing through and optically modulated by the R panel 11 is introduced into the cross dichroic prism 31 and is reflected by a reflecting face 31a of the cross dichroic prism 31 such that the advancing direction thereof is changed by 90 degrees, so that it thereafter advances along the optical axis of the projection lens 25 until it arrives at the cross dichroic prism 33. Then, the light flux R passes through a reflecting face 33a in the cross dichroic prism 33 and advances straightforwardly until it is introduced into the projection lens 25.

Meanwhile, a light flux G passing through and optically modulated by the G panel 12 passes through the reflecting faces 31a and 31b in the cross dichroic prism 31 without being reflected by them until it arrives at the cross dichroic prism 33. Then, the light flux G passes through the reflecting face 33a in the cross dichroic prism 33 and is introduced into the projection lens 25.

Also, a light flux B passing through the B panel 14 in a direction opposite to the direction of the light flux R is introduced into the cross dichroic prism 31. In this instance, the light flux B is reflected by the reflecting face 31b of the cross dichroic prism 31 such that the advancing direction thereof is changed by 90 degrees, so that it thereafter advances along the optical axis of the projection lens 25 until it is introduced into the cross dichroic, prism 33. Then, the light flux G passes through the reflecting face 53a in the cross dichroic prism 33 and is introduced into the projection lens 25.

Meanwhile, a light flux Cy passing through and optically modulated by the Cy panel 13 is introduced into the reflecting prism 32 and is reflected by a reflecting face 32a in the reflecting prism 32 such that the advancing direction thereof is changed by 90 degrees, so that it may be directed in an incoming direction to the cross dichroic prism 33. Then, in the cross dichroic prism 33, the light flux Cy is reflected by the reflecting face 33a such that the advancing direction thereof is changed by 90 degrees, so that it is introduced into the projection lens 25.

Accordingly, also in this instance, the optically modulated light fluxes (image lights) R, G, Cy, and D can be introduced into the projection lens 25 in a state wherein they are synthesized as a single light flux (display image light).

Figure 10:
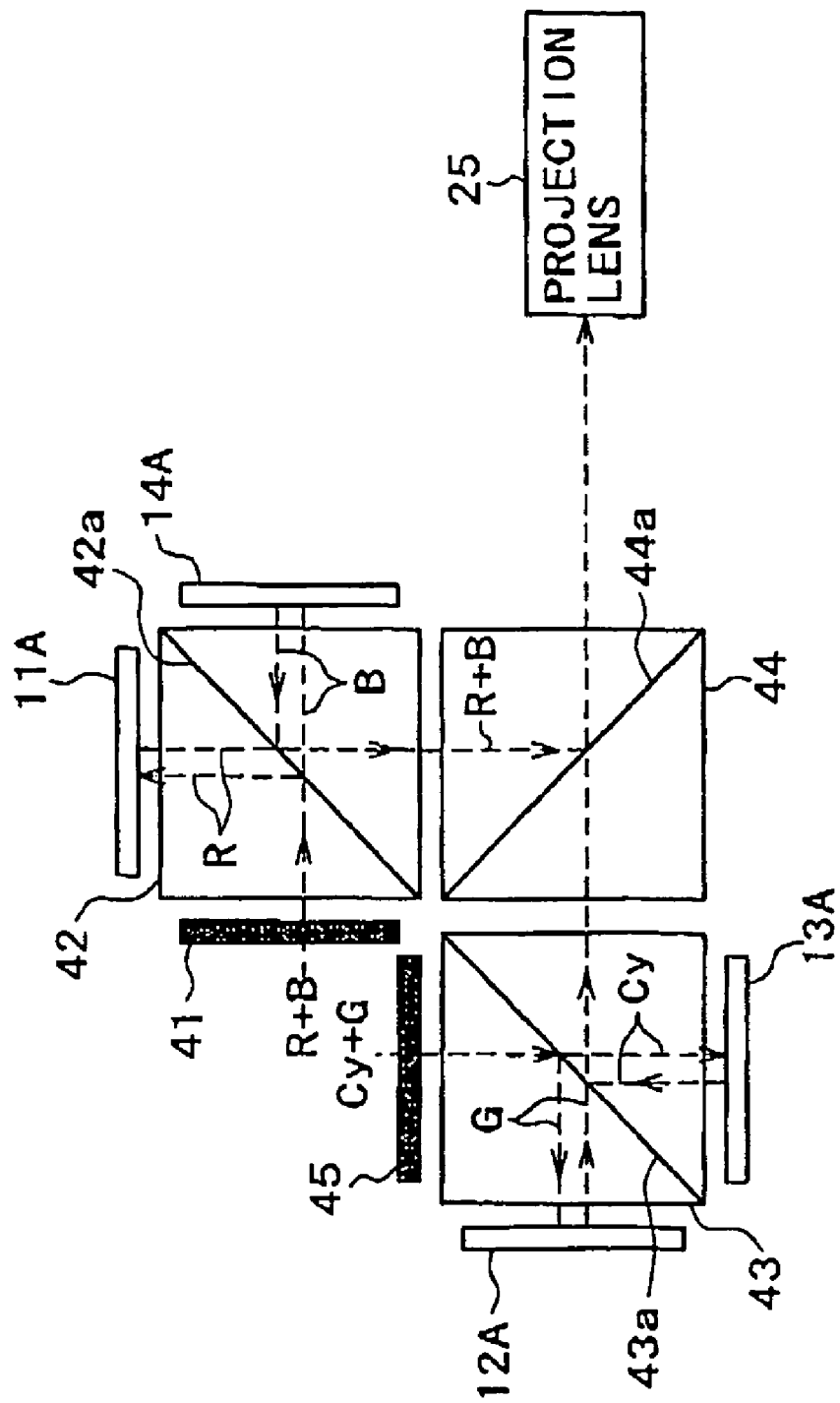

FIG. 10 shows an example of a configuration of the color synthesis optical system as a third example. In the third example, a reflection type liquid crystal panel is adopted for the optical modulation devices. Here, the reflection type liquid crystal display panels corresponding to the colors of R, G, Cy, and B are represented as an R panel 11A, a G panel 12A, a Cy panel 13A, and a B panel 14A, respectively.

In the color synthesis optical system shown in FIG. 10, a dichroic prism 44 is disposed at a position nearest to the projection lens 25 on the optical axis of the projection lens 25. A polarizing beam splitter 43 is disposed adjacent to a face of the dichroic prism 44 perpendicular to the optical axis of the projection lens 25, and another polarizing beam splitter 42 is disposed adjacent to a face of the dichroic prism 44 perpendicular to the optical axis of the projection lens 25.

The R panel 11A and the B panel 14A are disposed on two adjacent faces of the polarizing beam splitter 42. An R phase difference plate 41 is disposed on a remaining face of the polarizing beam splitter 42.

The G panel 12A and the Cy panel 13A are disposed on two adjacent faces of the polarizing beam splitter 43, and a G phase difference plate 45 is disposed on a remaining face of the polarizing beam splitter 43.

In this instance, the light fluxes R and B from among the light fluxes R, G, Cy, and B separated by the color separation optical system are both introduced into the R phase difference plate 41 as seen in FIG. 10. Further, the light fluxes R and B in a stage where they are introduced into the R phase difference plate 41 are in a state wherein they have a same plane (polarization direction) of vibration by one of a P wave and an S wave.

Meanwhile, the light fluxes Cy and G are both introduced Into the G phase difference plate 45. Also, the light fluxes Cy and G in a stage where they are introduced into the G phase difference plate 45 are in a state wherein they have a same polarization direction by one of a P wave or an S wave. For the convenience of description, it is assumed that all of the light fluxes R and B and the light fluxes Cy and G are in the form of a P wave.

The R phase difference plate 41 converts the polarization direction only of the light flux R from between the light flux R and the light flux B incoming thereto into a light flux R of the S wave but passes the light flux B therethrough without changing the polarization direction of the same, so that the light flux B remains in the P wave. In other words, the R phase difference plate 41 has a color selectivity in conversion of the polarization direction.

The light flux R and the light flux B passing the R phase difference plate 41 enters the polarizing beam splitter 42 and arrive at a reflecting face 42a in the polarizing beam splitter 42. The reflecting face 42a reflects the S wave but passes the P wave therethrough. Therefore, the light flux R is reflected by the reflecting face 42a while the light flux B passes through the reflecting face 42a without being reflected and then advances straightforwardly. Consequently, separation in color and advancing path between the light flux R and the light flux B is performed.

The light flux R reflected by the reflecting face 42a is introduced to the R panel 11A. The light flux R introduced to the R panel 11A is optically modulated and converted into a P wave and is reflected by the R panel 11A so that it is introduced back into the polarizing beam splitter 42. The light flux R of the P wave passes through the reflecting face 42a and is introduced into the dichroic prism 44.

Meanwhile, the light flux B passing through the reflecting face 42a and advancing straightforwardly is introduced to the B panel 14A by which optical conversion and conversion into an S wave of the light flux B are performed and the light flux B is reflected so that it is introduced back into the polarizing beam splitter 42. The light flux B in the form of an S wave then is reflected by the reflecting face 42a such that the advancing direction thereof is changed by 90 degrees, so that it is introduced into the dichroic prism 44.

In this manner, the optically modulated light fluxes R and B are introduced in a synthesized state into the dichroic prism 44.

As described hereinabove, the light fluxes Cy and G (both in the form of a P wave) are inputted to the G phase difference plate 45. Also, the G phase difference plate 45 has a color selectivity and changes the polarization direction only of the light of green (G).

Therefore, the G phase difference plate 45 changes the polarization direction only of the light flux G from between the light fluxes Cy and G incoming thereto as P waves to convert the light flux G into an S wave while it passes the light flux Cy therethrough without changing the polarization direction of the same so that the light flux Cy remains a P wave.

The light fluxes Cy and G passing through the G phase difference plate 45 are introduced into the polarizing beam splitter 43 and arrive at a reflecting face 43a in the polarizing beam splitter 43. Also, the reflecting face 43a in this instance reflects the S wave but passes the P wave therethrough, Consequently, the reflecting face 43a reflects the light flux G but passes the light flux B therethrough without reflecting it so that it thereafter advances straightforwardly. Therefore, separation in color and advancing path of the light fluxes Cy and G is performed.

The light flux G reflected by the reflecting face 43a is introduced to the G panel 12A by which the light flux G is optically modulated and converted into a P wave and is reflected. Then, the light flux G is introduced back into the polarizing beam splitter 43 and passes through the reflecting face 43a so that it is introduced into the dichroic prism 44.

Meanwhile, the light flux Cy passing through the reflecting face 43a and advancing straightforwardly is introduced to the Cy panel 13A by which it is optically modulated and converted into an S wave and is reflected.

Then, the light flux Cy is introduced back into the polarizing beam splitter 43 in which it is reflected by the reflecting face 43a so that the advancing direction is changed by 90 degrees and is introduced into the dichroic prism 44.

In this manner, also, the optically modulated light fluxes Cy and G are introduced in a synthesized state into the dichroic prism 44.

A reflecting face 44a of the dichroic prism 44 reflects light of red (R) and blue (B) but passes light of cyan (Cy) and green (G) therethrough. Consequently, the light fluxes R and B incoming to the dichroic prism 44 from the polarizing beam splitter 42 side are reflected by the reflecting face 44a of the dichroic prism 44 and introduced into the projection lens 25.

Meanwhile, the light fluxes Cy and G incoming from the polarizing beam splitter 43 side pass through the reflecting face 44a and advance straightforwardly until they are introduced into the projection lens 25.

In short, the optically modulated light fluxes R, G, P, and Cy are synthesized into one light flux, which is introduced into the projection lens 25 from the dichroic prism 44.

It is to be noted that the dichroic prism 44 may be replaced by an optical device block including a polarizing beam splitter. In the third example, two light fluxes including a light flux obtained by synthesis of the light fluxes R and B and another light flux obtained by synthesis of the light fluxes Cy and B are introduced into the color synthesis optical system. Accordingly, the color separation optical system in this instance may be configured such that it performs color separation to form two light fluxes including a light flux of R+B and another light flux of Cy+G in place of the configuration that performs color separation to separate white light into light fluxes R, G, R, and Cy as shown in FIG. 7.

Figure 11:
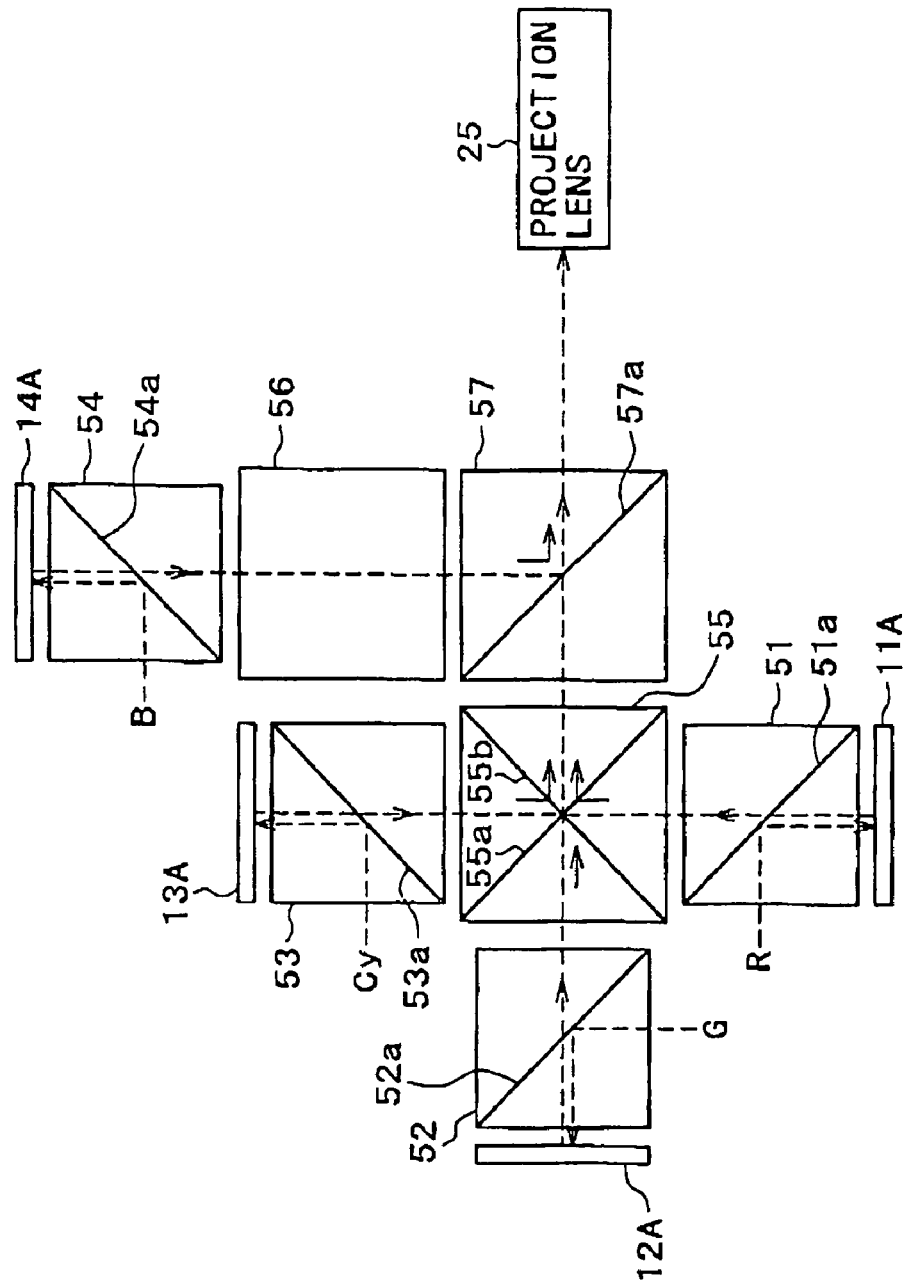

FIG. 11 shows an example of a configuration of the color synthesis optical system as a fourth example. Also in the fourth example, a reflection-type liquid crystal panel is used for the optical modulation devices.

Here, a cross dichroic prism 55 is disposed first Then, polarizing beam splitters 51, 52, and 53 are disposed on three faces of the cross dichroic prism 55. Further, a reflection type liquid crystal panel is disposed on a face of each of the polarizing beam splitters 51, 52, and 53 remote from the cross dichroic prism 55. Here, an R panel 11A, a G panel 12A, and a Cy panel 13A are disposed on the polarizing beam splitters 51, 52, and 53, respectively. A dichroic prism 57 is disposed between the remaining face of the cross dichroic prism 55 and the projection lens 25. The cross dichroic prism 55 and the dichroic prism 57 are disposed on the optical axis of the projection lens 25.

A dummy prism 56 (or a polarizing beam splitter) is disposed on a face of the dichroic prism 57, which is positioned on a light path perpendicular to the optical axis of the projection lens 25, and a polarizing beam splitter 54 is disposed on a face of the dummy prism 56. A B panel 14A, which is the remaining reflection type liquid crystal panel, is disposed on a face of the polarizing beam splitter 54.

The dummy prism 56 is disposed in order to adjust the light path distance of the light flux B from the B panel 14A to the projection lens 25 so that it may be equal to the light path distances of the light fluxes R, G, and Cy from the other liquid crystal panels (R panel 11A, G panel 12A, and Cy panel 13A) to the projection lens 25.

Each of the light fluxes R, G, Cy, and B to be introduced to the polarizing beam splitters 51, 52, 53, and 54 has one of polarization directions, a P wave or an S wave. Each of reflecting faces 51a, 52a, 53a, and 54a of the polarizing beam splitters 51, 52, 53, and 54 reflects light of the polarization direction given to the incoming light flux thereto.

When the light flux R is introduced into the polarizing beam splitter 51, it is reflected by a reflecting face 51a of the polarizing beam splitter 51 and introduced to the R panel 11A. The R panel 11A performs modulation and conversion of the polarization plane of the incoming light flux R and reflects the light flux R so that it is introduced back into the polarizing beam splitter 51. The optically modulated light flux R introduced into the polarizing beam splitter 51 passes through the reflecting face 51a of the polarizing beam splitter 51 and is introduced into the cross dichroic prism 55.

Also, the light flux G introduced into the polarizing beam splitter 52 is similarly reflected by the reflecting face 52a of the polarizing beam splitter 52 and introduced to the G panel 12A by which it is subject to optical modulation and conversion of the polarization plane and is reflected so that it is introduced back into the polarizing beam splitter 52. The light flux G introduced back into the polarizing beam splitter 52 passes through the reflecting face 52a and is introduced into the cross dichroic prism 55.

Similarly, the light flux Cy introduced into the polarizing beam splitter 53 is reflected by the reflecting face 53a and introduced to the Cy panel 13A by which it is subject to optical modulation and conversion of the polarization plane and is reflected so that it is introduced back into the polarizing beam splitter 53. The light flux Cy then passes through the reflecting face 53a and is introduced into the cross dichroic prism 55.

The cross dichroic prism 55 hag two reflecting faces 55a and 55b formed in an intersecting relationship with each other therein. The reflecting face 55a reflects light of cyan (Cy) and passes light of, for example, red (R) and green (G) therethrough. The reflecting face 55b reflects light of red (R) and passes light of cyan (Cy) and green (G) therethrough.

Consequently, the light flux R from among the light fluxes R, Cy, and G incoming to the cross dichroic prism 55 is reflected by the reflecting face 55b and introduced into the dichroic prism 57. The light flux Cy is reflected by the reflecting face 55a and introduced into the dichroic prism 57. The light flux G passes through the reflecting faces 55a and 55b and is introduced into the dichroic prism 57.

Meanwhile, the light flux B introduced into the polarizing beam splitter 54 is reflected by a reflecting face 54a and introduced to the B panel 14A. The B panel 14A performs optical modulation and conversion of the polarization plane of the light flux 8 and reflects the light flux 8 so that it is introduced back into the polarizing beam splitter 54. The light flux B introduced back into the polarizing beam splitter 54 passes through the reflecting face 54a and is introduced into the cross dichroic prism 55 through the dummy prism 56.

Thus, a light flux obtained by synthesis of the optically modulated light fluxes R, G, and Cy is introduced in a direction along the optical axis of the projection lens 25 into the dichroic prism 57. Meanwhile, the optically modulated light flux B is introduced into the dichroic prism 57 from a direction perpendicular to the optical axis of the projection lens 25.

A reflecting face 57a of the dichroic prism 57 reflects light of blue (B) and passes light of, for example, red (R), green (G), and cyan (Cy) therethrough. Consequently, the light fluxes R, G, and Cy introduced into the dichroic prism 57 pass through the reflecting, face 57a and are introduced into the projection lens 25. Meanwhile, the light flux B is reflected by the reflecting face 57a such that the advancing direction thereof is changed by 90 degrees so that the light flux 2 is introduced into the projection lens 25. In this manner, a single flux obtained by synthesis of the optically modulated light fluxes R, G, Cy, and B can be introduced into the projection lens 25 from the dichroic prism 57.

Figure 12:
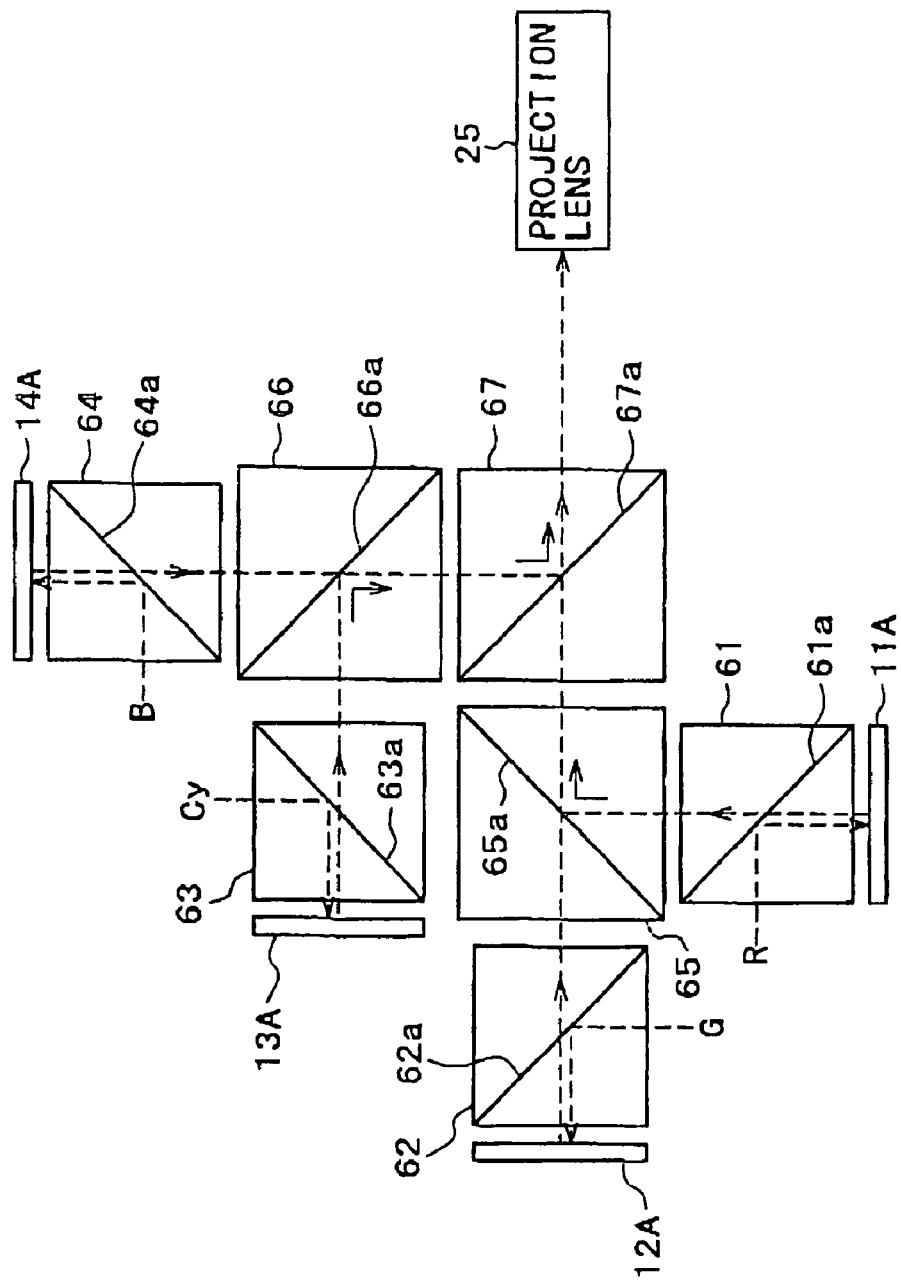

FIG. 12 shows an example of a configuration of the color synthesis optical system as the fifth embodiment. Also, the present fifth example adopts a reflection type liquid crystal panel for the optical modulation devices.

The reflection type liquid crystal panel of the present configuration includes three dichroic prisms 65, 66, and 67.

Polarizing beam splitters 61 and 62 are disposed on two faces of the dichroic prism 65. A dichroic prism 67 is disposed between the other face of the dichroic prism 65 and the projection lens 25. In this instance, the dichroic prisms 65 and 67 are disposed such that they are positioned on the optical axis of the projection lens 25.

The R panel 11A and the G panel 12A are disposed on faces of the polarizing beam splitters 61 and 62, respectively.

A dichroic prism 66 is disposed on a face of the dichroic prism 67 positioned on an optical axis, perpendicular to the optical axis of the projection lens 25 as seen in FIG. 12. Two polarizing beam splitters 63 and 64 are disposed on two different faces of the dichroic prism 66. The Cy panel ISA and the B panel 14A are disposed for the polarizing beam splitters 63 and 64, respectively.

Also, in this instance, each of the light fluxes R, G, Cy, and P to be introduced into the polarizing beam splitters 61, 62, 63, and 64 has one of the polarization directions, a P wave or an S wave, similar to the arrangement of FIG. 11.

Each of reflecting faces 61a, 62a, 63a, and 64a of the polarizing beam splitters 61, 62, 63, and 64 reflects light of the polarization direction given to the incoming light flux thereto.

The R light flux introduced into the polarizing beam splitter 61 is reflected by the reflecting face 61a and introduced to the R panel 11A by which it is subject to optical modulation and conversion of the polarization plane and is reflected so that it is introduced into the polarizing beam splitter 61. Then, the R light flux passes through the reflecting face 61a and is introduced into the dichroic prism 65.

The G light flux introduced into the polarizing beam splitter 62 is reflected by the reflecting face 62a and introduced to the G panel 12A by which it is subject to optical modulation and conversion of the polarization plane and is reflected so that it is introduced back into the polarizing beam splitter 62. Then, flux G the light passes through the reflecting face 62a and is introduced into the dichroic prism 65.

A reflecting face 65a of the dichroic prism 65 reflects red (R) light but passes green (G) light therethrough. Consequently, the optically modulated light fluxes R and G introduced into the dichroic prism 65 are introduced in a synthesized state into the dichroic prism 67.

The Cy light flux introduced into the polarizing beam splitter 63 is reflected by the reflecting face 63a and introduced into the Cy panel 13A by which it is subject to modulation and conversion of the polarization plane and is reflected so that it is introduced back into the polarizing beam splitter 63. Then, the Cy light flux passes through the reflecting face 63a and is introduced into the dichroic prism 66.

The B light flux introduced into the polarizing beam splitter 64 is reflected by the reflecting face 64a and introduced to the B panel 14A, by which it is subject to modulation and conversion of the polarization plane and is reflected so that it is introduced into the polarizing beam splitter 64. Then, the S light flux passes through the reflecting face 64a and is introduced into the dichroic prism 66.

A reflecting fate 66a of the dichroic prism 66 reflects light of cyan (Cy) but passes light of blue (B) therethrough. Therefore, also the optically modulated I Cy and B light fluxes, introduced into the dichroic, prism 66 are introduced in a synthesized state into the dichroic prism 67.

The light flux obtained by synthesizing the optically modulated R and G light fluxes as described above is introduced into the dichroic prism 67 along the optical axis of the projection lens 25. Meanwhile, the light flux obtained by synthesizing the optically modulated Cy and B light fluxes is introduced into the dichroic, prism 67 from a direction perpendicular to the optical axis of the projection lens 25.

A reflecting face 67a of the dichroic prism 67 passes red (R) light and green (G) therethrough but reflects cyan (Cy) light and blue (B) light. Consequently, the R and G light fluxes pass through the reflecting face 67a of the dichroic prism 67 and are introduced into the projection lens 25 while the Cy and B light fluxes are reflected by the reflecting face 67a of the dichroic prism 67 to change their advancing direction so that they are introduced into the projection lens 25. In this manner, also the fifth example has a structure that can synthesize the R, G, Cy, and B light fluxes into one light flux and introduces the synthesized light flux into the projection lens 25.

Since the projector apparatus of the present embodiment includes one of the color synthesis optical system described hereinabove with reference to FIG. 8 and the color synthesis optical systems described hereinabove with reference to FIGS. 9 to 12, it has a basic configuration as a projector apparatus of the four-panel type ready for the four colors R, G, B, and Cy. Based on the basic configuration, the projector apparatus of the present embodiment has a configuration for embedding a shot-sneaking preventing image portion "Ppr" formed from the three colors R, Cy, and B in a predetermined display form into an original image displayed in the three colors of R, G, and B as described hereinabove with reference to FIGS. 4A to 6C based on the principle described hereinabove with reference to FIGS. 1A to 3C.

FIG. 13 shows a configuration of a driving circuit system for driving a liquid crystal panel as an optical modulation device in the projector apparatus according to the present embodiment. Where the configuration on of the driving circuit system shown in FIG. 13 is adopted, a shot-sneaking preventing image portion "Ppr" formed from the three colors R, Cy, and B can be embedded into an original image formed from the three colors of R, G, and B in such a manner as described above.

It is to be noted that the driving circuit system shown in FIG. 13 includes four liquid crystal panels, including an R panel 11 or 11A, a G panel 12 or 12A, a Cy panel 13 or 13A, and a B panel 14 or 14A. In particular, the liquid crystal panels in the driving circuit system shown in FIG. 13 are the liquid crystal panels of the transmission type or the reflection type provided in the color synthesis optical systems shown in FIGS. 8 to 12 and ready for the colors R, G, Cy, and B.

Image signals according to the R, G, B system are inputted to the driving circuit system. In particular, R, G, and B image signals corresponding to the color components of R, G, and B are inputted to the driving circuit system as seen in FIG. 13.

The R, G, and B image signals inputted to the driving circuit system are branched and inputted to a first color space conversion section 71 and a second color space conversion section 72.

Each of the first color space conversion section 71 and the second color space conversion section 72 converts a color space with which a certain color is currently represented into another different color space based on the color space conversion principle.

The first color space conversion section 71 converts the R, G, and B image signals inputted thereto into R, G, and B image signals having an R value, a G value, and a B value for allowing reproduction of the color according to the R, G, and B color space and outputs the resulting R, G, and B image signals to terminals of a required switch of a switch section 73 hereinafter described.

It is to be noted that, in this instance, since the color space of R, G, and B is converted into the same color space of R, G, and B, for example, the first color space conversion section 71 may otherwise be omitted while the inputted R, G, and B image signals are inputted directly to the terminals of the required switch of the switch section 73.

Meanwhile, the second color space conversion section 72 converts the color space of R, G, and B corresponding to the inputted R, G, and B image signals into a space formed from R, Cy, and B and produces and outputs R, Cy, and B image signals corresponding to the color space of R, Cy, and B obtained by the conversion.

In particular, the R, G, and B values of the inputted R, G, and B image signals are utilized to execute a required arithmetic operation process for the conversion into the color space of R, Cy, and B to obtain color component values of the P, Cy, and B values. It is to be noted that a chromaticity and a luminance represented with the R, Cy, and B values after the color space conversion are the same as those represented with the R, G, and B values before the color space conversion. In other words, a color is reproduced such that it looks like the same color and brightness to the visual sense of the human being. Then, as described hereinabove with reference to FIG. 3, depending upon whether a certain same chromaticity (and luminance) is represented with the color space by R, G, and B or with the color space by R, Cy, and B, the values assumed by R and B, which are common color components to the two cases, differ from each other.

Then, R, Cy, and B image signals having the R, Cy, and B values obtained by the color space conversion in this manner are produced and outputted. In particular, the second color space conversion section 72 outputs R, Cy, and B image signals with which an image is reproduced with a same chromaticity and a same brightness as those of the inputted R, G, and B image signals to the terminals of the required switch of the switch section 73.

The switch section 73 includes four switches 73-1 to 73-4. Each of the switches 73-1 to 73-4 has terminals Ta, Tb, and Tc and is switched such that the terminal Tc is connected alternatively to the terminal Ta or the terminal Tb. The switching control of the terminals of the switches 73-1 to 73-4 is performed commonly with a switching control signal outputted from a switching control signal generation section 74 hereinafter described. In short, if a switching control signal indicating the terminal Ta is outputted, then switching is performed such that the terminal Tc is connected to the terminal Ta in all of the switches 73-1 to 73-4. On the contrary, if a switching control signal indicating the terminal Tb is outputted, then switching is performed such that the terminal Tc is connected to the terminal Tb in all of the switches 73-1 to 73-4.

An R image signal outputted from the first color space conversion section 71 is inputted to the terminal Ta of the switch 73-1. Another R image signal outputted from the second color space conversion section 72 is inputted to the terminal Tb of, the switch 73-1. The terminal Tc of the switch 73-1 is connected to an image signal input terminal of the R panel 11 or 11A.

A G image signal outputted from the first color space conversion section 71 is inputted to the terminal Ta of the switch 73-2. In this instance, the terminal Tb is open. The terminal Tc is connected to an image signal input terminal of the G panel 12 or 12A.

The terminal Ta of the switch 73-3 is open, and a Cy image signal outputted from the second color space conversion section 72 is inputted to the terminal Tb. The terminal TC is connected to an image signal input terminal of the Cy panel 13 or 13A.

A B image signal outputted from the first color space conversion section 71 is inputted to the terminal Ta of the switch 73-4. Another B image signal outputted from the second color space conversion section 72 is inputted to the terminal Tb. The terminal Tc is connected to an image signal input terminal of the B panel 14 or 14A.

According to the connection scheme for the terminals of the switches 73-1 to 73-4 described above, if the terminal Ta is connected to the terminal Tc in all of the switches 73-1 to 73-4, then an R image signal outputted from the first color space conversion section 71 is inputted to the R panel 11 or 11A. Meanwhile, a G image signal outputted from the first color space conversion section 71 is inputted to the G panel 12 or 12A and a B image signal outputted from the first color space conversion section 71 is inputted to the B panel 14 or 14A. No image signal is inputted to the Cy panel 13 or 13A.

In this instance, the three liquid crystal panels of the R panel 11 or 11A, G panel 12 or 12A, and B panel 14 or 14A are driven with R, G, and B image signals outputted from the first color space conversion section 71 and perform optical modulation for the incoming light fluxes R, G, and B, respectively, and output the modulated light fluxes R, G, and B.

On the other hand, no image signal is inputted to the Cy panel 13 or 13A. According to the configurations of the color separation/synthesis optical systems, the liquid crystal panels including the Cy panel 13 or 13A normally remain in a state wherein the light flux Cy separated from white light from the light source 1 is steadily introduced into them. However, if no image signal is inputted to any of the liquid crystal panels as described above, then the liquid crystal panel does not operate and does not emit an optically modulated light flux. Accordingly, in this instance, no modulated light is emitted from the Cy panel 13 or 13A.

As a result, where the terminal Ta is connected to the terminal Tc in all of the switches 73-1 to 73-4, the of R, G, and B light fluxes are optically modulated by the three liquid crystal panels of the R panel 11 or 11A, G panel 12 or 12A, and B panel 14 or 14A and display image light obtained by synthesizing the light fluxes is introduced into the projection lens 25. Accordingly, in this instance, a state is established wherein an image (original image) formed from image light color-reproduced with the of R, G, and B color space.

Operation of the projector apparatus when the terminal Ta is connected to the terminal Tc in the switches 73-1 to 73-4 corresponds to a second image light generation section in the present invention.

In contrast, when the terminal Tb is connected to the terminal Tc in the switches 73-1 to 73-4, the panel driving circuit system operates in the following manner.

In particular, an R image signal Outputted from the second color space conversion section 72 is inputted to the R panel 11 Or 11A. No image signal is inputted to the G panel 12 or 12A. A Cy image signal outputted from the second color space conversion section 72 is inputted to the Cy panel 13 or 13A, and a B image signal outputted from the second color space conversion section 72 is inputted to the B panel 14 or 14A.

Accordingly, in this instance, the R panel 11 or 11A, Cy panel 13 or 13A, and B panel 14 or 14A other than the G panel 12 or 12A perform optical modulation for the incoming R, Cy, and B light fluxes in accordance with R, Cy, and B image signals outputted from the second color space conversion section 72 and emit the modulated R, Cy, and B light fluxes, respectively. Consequently, display image light obtained by synthesizing the R, Cy, and B light fluxes other than the of G light flux is projected in an enlarged scale from the projection lens 25. As a result, a state is established wherein an image of image light color-reproduced with the of R, Cy, and B color space is displayed.

Operation of the projector apparatus when the terminal Tb is connected to the terminal Tc in the switches 73-1 to 73-4 corresponds to a first image light generation section in the present invention.

To the switching control signal generation section 74, for example, data representative of horizontal/vertical positions (pixel positions) on a frame image is inputted as image data of a shot-sneaking preventing image portion "Ppr" to be embedded into an original signal. The switching control signal generation section 74 generates a switching control signal based on the data inputted thereto and outputs the switching control signal to the switch section 73.

In particular, at a timing at which pixels of an original image are to be displayed in a frame (or field) image, a switching control signal for connecting the terminal Ta to the terminal Tc is outputted. Consequently, pixels color-reproduced with the color space of R, G, and B corresponding to the original image can be displayed and outputted.

In contrast, at another timing at which pixels of a shot-sneaking preventing image portion "Ppr" are to be displayed in a frame (or field) image, a switching control signal for connecting the terminal Tb to the terminal Tc is outputted. Consequently, pixels color-reproduced with the of R, Cy, and B color space corresponding to the shot-sneaking preventing image portion "Ppr" can be displayed and outputted.

Here, for example, if data of the shot-sneaking preventing image portion "Ppr" shown in FIG. 4B is inputted to the switching control signal generation section 74, then such an image as shown in FIG. 4B is obtained actually as a display image. Also, such a display image wherein the shot-sneaking preventing image portion "Ppr" changes as time passes in such a manner as seen in FIGS. 5A to 5C or 6A to 6C can be realized readily if data of the shot-sneaking preventing image portion "Ppr" shown in the figures is inputted to the switching control signal generation section 74. Furthermore, if data representative of random movements or variations of the shot-sneaking preventing image portion "Ppr" as described above is inputted, then the shot-sneaking preventing image portion "Ppr" is displayed accordingly.

Incidentally, the R, G, and B image signals inputted to the panel driving circuit system described above with reference to FIG. 13 are used to display the original image and can assume values in the ranges of R, G, and B values with which color reproduction is performed, for example, within the range of the region Ar2 defined by the coordinate values of the chromaticity points for R, G, and B shown in FIGS. 1A and 2.

In contrast, the shot-sneaking preventing image portion "Ppr" should have a chromaticity and a luminance equal to those of the original image. Accordingly, the color reproducible range for the shot-sneaking preventing image portion "Ppr" is a color reproducible range only with the color space formed from R, G, and B, for example, within the region Ar4 defined by the coordinates of the chromaticity points for R, Cy, and B shown in FIG. 2, This is an overlapping region Ar5 within which the ranges of the region Ar4 and the region Ar2, which is defined by the chromaticity points for R, G, and B, overlap with each other.

Accordingly, in the present embodiment, when a shot-sneaking preventing image portion "Ppr" on an original image, which is visually recognized as a certain predetermined shape or pattern is to be displayed, the switches 73-1 to 73-4 are actually switched to the terminal Tb side to perform image display according to R, Cy, and B only at each pixel at which the chromaticity (and luminance) to be reproduced with inputted R, G, and B signals is within the range of the overlapping region Ar5.

In contrast, where the chromaticity (and luminance) to be reproduced with the inputted R, G, and B image signals is outside the range of the overlapping region Ar5 within the region Ar2 corresponding to the R, G, and B color space, the color reproduction cannot be performed with R, Cy, and 13. Therefore, in this instance, even at a pixel that is visually positioned within the range of the contour frame of the shot-sneaking preventing image portion Ppr, the switches 73-1 to 73-4 are switched to the terminal Ta side so that an image display by R, G, and B color space is performed.

Therefore, it may possibly occur that, with the actual shot-sneaking preventing image portion Ppr, a contour pattern intended originally is not formed fully.

As a particular example, it is assumed that the shot-sneaking preventing image portion "Ppr" is, for example, a pattern of a X mark shown in FIG. 4S. In FIG. 4B, it can be seen that a display by R, Cy, and 8 is performed by all of the pixels within the contour frame of the X mark pattern.

However, since the display operation described above is performed actually, for each of those pixels according to R, G, and B values that exists outside the range of the overlapping region Ar5 within the region Ar2 corresponding to the of R, G, B color space from among the pixels in the outer frame of the X mark pattern, the switches 73-1 to 73-4 are switched to the terminal Ta side to perform the pixel display by R, G, and R.

As a result, the actual shot-sneaking preventing image portion "Ppr" of FIG. 4B does not have a shape of the complete X mark but has an incomplete shape because it partly misses due to the pixel display by R, G, and B.

However, according to the object of the present invention, it is intended to display, on an image displayed, an image reproduced by a color space different from that of the original image to deteriorate the picture quality of the original image picked up by a camera thereby to prevent shot-sneaking.

Accordingly, even if a complete shape pattern of the shot-sneaking preventing image portion "Ppr" is not obtained in such a manner as described above, the shot-sneaking preventing image portion "Ppr" as picked up by the camera visually remains in a shape that can be recognized substantially as a X mark. In other words, the shot-sneaking preventing image portion "Ppr" sufficiently achieves the function of preventing shot-sneaking.

It is to be noted that, in order to obtain a complete shape pattern of the shot-sneaking preventing image portion Ppr, the R, G, and B signals to be inputted to the panel driving circuit system shown in FIG. 13 should be limited to the ranges of the R, G, and B values that can represent only the colors within the range of the overlapping region Ar5 shown in FIG. 2. In this instance, however, the color reproduction range of the original image is similarly restricted.

The projector apparatus according to the present embodiment described above can be used also as an ordinary projector apparatus of the four-panel type ready for R, G, B, and Cy. In particular, image signals of the R, G, B, and Cy colors are inputted as the input image signals to the projector apparatus, and the liquid crystal panels for R, G, B, and Cy are driven with the image signals to optically modulate the of R, G, 2, and Cy light fluxes. Then, all of the four optically modulated light fluxes R, G, R, and Cy are synthesized and inputted to the projection lens 25. In this instance, a higher color reproducibility and a higher luminance than those where the three colors of, for example, R, G, and B (or R, Cy, and B) are used to display an image are achieved as described above, and consequently, an image of a higher picture quality can be displayed.

The present invention is not limited to the configurations described hereinabove in connection with the embodiment thereof.

For example, in the embodiment described above, the first color component group for forming a shot-sneaking preventing image portion "Ppr" is a combination of the color components of R, Cy, and B while the second color component group for forming an original image is a combination of the color components of R, G, and S.

However, the combinations of color components in the first and second color component groups are not limited only to those described above if, for example, a range necessary and sufficient to form the shot-sneaking preventing image portion "Ppr" is secured with regard to the overlapping region of the color reproduction ranges by the first and second color component groups.

Further, in the embodiment described above, only one first color component group (R, Cy, B) for forming the shot-sneaking preventing image portion "Ppr" is provided for the second color component group (R, G, B) corresponding to an original image. However, according to the concept of the present invention, a plurality of first color component groups having different combinations in color from each other may be provided.

In this instance, the projector apparatus includes color separation optical systems, optical modulation devices (liquid crystal panels), and color synthesis systems corresponding to the color components, which form the first color component groups. Further, the projector apparatus includes a plural number of second color space conversion sections 72 corresponding to the first color component groups.

In order to form a shot-sneaking preventing image portion Ppr, the first color component groups may be suitably and switchably used such that an image by a color space corresponding to one of the first color component groups is displayed at a required timing.

Further, in the embodiment described above, in addition to the prerequisite that an original image by the second color component (R, G, B) set is displayed, the shot-sneaking preventing image portion "Ppr" by the first color component group (R, Cy, B) is formed on the original image.

However, in the concept of the present invention, an image may be displayed only with the first color component group (R, Cy, B). In particular, if this is applied to the configuration shown in FIG. 13, the terminal Tb and the terminal Tc are connected steadily in the switches 73-1 to 73-4 so that an image is displayed by the color space of the first color component group (R, Cy, B).

In this instance, the entire image displayed is formed from a set of pixels according to the color space of the first color component group (R, Cy, By). In other words, the shot-sneaking preventing image portion "Ppr" is displayed over the overall screen. Also in this instance, the display image looks like the same color (brightness) as that of the original image by the second color component group (R, G, B). Then, if an image of the display image is picked up by a camera, the entire screen exhibits a color that is not normal. In other words, even if switching is not performed, the quality of the image picked up with the camera can be deteriorated, having the effect of preventing shot-sneaking.

Complementarily, the reason why, in the embodiment described above, a shot-sneaking preventing image portion "Ppr" according to the first color component group (R, Cy, B) is embedded in an original image according to the second color component group (R, G, B) and the shape pattern of the shot-sneaking preventing image portion "Ppr" can be changed is that it is intended to further strengthen the prevention of shot-sneaking.

It is to be noted, however, that the range of the color within which the shot-sneaking preventing image portion "Ppr" can be displayed with the first color component group (R, Cy, B) is restricted to the overlapping region Ar5 of FIG. 2 as described hereinabove. Accordingly, where the first color component group (R, Cy, B) is used for a display over the overall screen, the color range reproducible on the display image also corresponds to the overlapping region Ar5.

In summary, according to the present invention, image lights are formed by the first image light generation means for individual color components, which form the first color component group (R, Cy, B), and image light is obtained by synthesizing the image lights and is used to display an image, The color component values of the colors are set so that the chromaticity point and the luminance represented by a color space of the first color component group (R, Cy, B) formed by the first image light generation means may be equal to the chromaticity point and the luminance represented by another color space of the second color component group (R, G, 9).

The display image displayed by synthesizing the image lights formed by the first image light generation means for the individual color components that form the first color component group (R, Cy, B) appears to the visual sense of the human being to be in the same color as that of the display image displayed by synthesizing the image lights for the individual color components that form the second color component group (R, G, B). However, when the first color component group (R, Cy, R) and the second color component group (R, G, B) reproduce the same chromaticity point, the color component values of the common components are different from each other, that is, different values are used, for each common component between the two color component groups. Therefore, if an image of the display image according to the first color component group is picked up by a camera apparatus, which adopts a method conforming to the second color component group, then it looks in a different color. In other words, where an image of the display image is picked up by a camera apparatus and, for example, recorded, then the picked up image exhibits a deteriorated picture quality in which it does not have a normal color.

Consequently, even if an image of the display image is picked up and recorded, for example, by shot-sneaking, the recorded display image is deteriorated in terms of the picture quality as described above. Consequently, such an illegal action as short-sneaking is prevented.

Further, as described hereinabove, the display image according to the first color component group (R, C, B) looks in a normal color to the visual sense of the human being. In other words, while the display image is an image for preventing short-sneaking, as far as an appreciating person looks at the display image normally, advantageously there is no influence as picture quality deterioration caused by such a countermeasure for preventing shot-sneaking as described above.

While a preferred embodiment of the invention has been described using specific terms, such description is for illustrative purposes only, and it is to be understood that changes and variations may be made without departing from the spirit or scope of the following claims.

What is claimed is:

1. An image display apparatus, comprising:
   first image light generation means for generating image lights individually corresponding to a plurality of color components, which form a single first color component group; and
   display image light generation means for synthesizing the image lights of the individual color components generated by said first image light generation means to generate a first display image light;
   said first image light generation means setting color component values of the individual color components of the first color component group, so that the first display image light may be generated with a chromaticity point and a luminance equal to those of a second display image light, wherein the second display image light includes synthesized image lights individually corresponding to color components of a second color component group whose color components in combination are different from those of the first color component group, and wherein said first image light generation means generates image lights individually corresponding to the color components, of the first color component group based on the set color component values;
   second image light generation means for generating image lights individually corresponding to the color components, which form said second color component group;
   said display image light generation means synthesizing the image lights of the individual color components generated by said second image light generation means to generate the single second display image light; and
   switching means for switching the image lights to be synthesized by said display image light generation means between the image lights generated by said first image light generation means and the image lights generated by said second image light generation means based on data provided through a predetermined image pattern input to said switching means.

2. The image display apparatus according to claim 1, wherein said switching means performs the switching in appropriate timing so that the predetermined image pattern formed by image lights of said first color component group is embedded in an image formed from image lights of said second color component group.

3. An image display method, comprising:
   a first image light generation step of generating image lights individually corresponding to a plurality of color components, which form a first color component group; and
   a display image light generation step of synthesizing the image lights of the individual color components generated by the first image light generation step to generate a single first display image light;
   the first image light generation step setting color component values of the individual color components, which form the first color component group, so that the first display image light may be generated with a chromaticity point and a luminance equal to those of a second display image light to be generated by synthesizing image lights individually corresponding to color components of a second color component group whose color components in combination are different from those of the first color component group, the first image light generation step generating image lights individually corresponding to the color components, which form the first color component group based on the set color component values;
   a second image light generation step generating image lights individually corresponding to the color components, which form the second color component group;
   the display image light generation step synthesizing the image lights of the individual color components generated by the second image light generation step to generate the single second display image light; and
   a switching step of switching the image lights to be synthesized by the display image light generation step between the image lights generated by the first image light generation step and the image lights generated by the second image light generation step based on data provided through a predetermined image pattern input to a switching means.

4. The image display method according to claim 3, wherein the switching step performs the switching at the required timing so that a variation according to a predetermined form is provided to a portion of the image formed with the first display image light.

5. An image display apparatus, comprising:
   first image light generator that generates image lights individually corresponding to a plurality of color components, which form a single first color component group; and
   display image light generator that synthesizes the image lights of the individual color components generated by said first image light generator to generate a first display image light;
   said first image light generator setting color component values of the individual color components, which form the first color component group, so that the first display image light may be generated with a chromaticity point and a luminance equal to those of a second display image light to be generated by synthesizing image lights individually corresponding to color components of a second color component group whose color components in combination are different from those of the first color component group, said first image light generator generating image lights individually corresponding to the color components, which form the first color component group based on the set color component values;
   a second image light generator that generates image lights individually corresponding to a plurality of color components, which form said second color component group;
   the display image light generator synthesizes said image lights of the individual color components generated by the second image light generator to generate the single second display image light; and
   a switch that switches the image lights to be synthesized by the display image light generator between the image lights generated by the first image light generator and the image lights generated by the second image light generator based on data provided through a predetermined image pattern input to said switch.

6. The image display apparatus of claim 5, wherein said switch performs the switching at an appropriate time so that the predetermined image pattern formed by image lights of said first color component group is embedded in an image formed from image lights of said second color component group.

* * * * *